US011940762B2

(12) United States Patent
Walklin

(10) Patent No.: US 11,940,762 B2
(45) Date of Patent: Mar. 26, 2024

(54) MULTI-FACTOR VERIFICATION TIMING AND DISPLAYING SYSTEM

(71) Applicant: Daniel Walklin, Bath (GB)

(72) Inventor: Daniel Walklin, Bath (GB)

( * ) Notice: Subject to any disclaimer, the term of this patent is extended or adjusted under 35 U.S.C. 154(b) by 480 days.

(21) Appl. No.: 17/341,111

(22) Filed: Jun. 7, 2021

(65) Prior Publication Data

US 2022/0043401 A1 Feb. 10, 2022

(30) Foreign Application Priority Data

Jun. 10, 2020 (GB) ...................................... 2008831

(51) Int. Cl.
*G04F 10/00* (2006.01)
*A63B 24/00* (2006.01)
*A63B 71/06* (2006.01)
*G10G 7/02* (2006.01)

(52) U.S. Cl.
CPC .......... *G04F 10/00* (2013.01); *A63B 24/0062* (2013.01); *A63B 71/0622* (2013.01); *G10G 7/02* (2013.01); *A63B 2220/40* (2013.01); *A63B 2220/62* (2013.01); *A63B 2220/805* (2013.01); *A63B 2225/50* (2013.01)

(58) Field of Classification Search
CPC . G04F 10/00; A64B 24/0062; A63B 2220/62; A63B 24/0062
See application file for complete search history.

(56) References Cited

U.S. PATENT DOCUMENTS 5,195,061 A * 3/1993 Curtis ..................... G04F 10/00 368/113

FOREIGN PATENT DOCUMENTS

CN 107886936 A * 4/2018

* cited by examiner

*Primary Examiner* — Daniel J Colilla
(74) *Attorney, Agent, or Firm* — Sam Pierce

(57) ABSTRACT

The invention is a device that attaches to musical equipment/instruments or fitness equipment, that can automatically track and display the duration of time a user has used the equipment using novel multi-factor verification from multiple sensors. The device includes a piezo vibration sensor, an accelerometer/gyroscope, a light sensor and IR sensor, a microprocessor, a battery for power, non-volatile memory, a mounting system, an inbuilt display, an antenna with means of wireless communication, and at least one button. The device functions via a multi-level verification process to ensure correct usage has been detected. The sensors to detect use are a piezo vibration sensor, accelerometer/gyroscope and a light sensor. In addition, the device also allows a user to select and create configurations to detect use of a variety of different objects. This could involve changing different sensor priorities, changing sensors sensitivity or disabling sensors.

15 Claims, 38 Drawing Sheets

MULTI-FACTOR VERIFICATION TIMING AND DISPLAYING SYSTEM

CROSS-REFERENCE TO RELATED APPLICATIONS

The present application is in reference to and claims priority of a pending UK patent application number GB200883.6 filed on 10 Jun. 2020, entitled “Multi-Factor Verification and Timing Displaying System” by the present inventor Daniel Walklin.

STATEMENT REGARDING FEDERALLY SPONSORED RESEARCH OR DEVELOPMENT (IF APPLICABLE)

Not applicable

FIELD OF THE INVENTION

This invention relates to a device that can track and display the duration of time a user uses musical equipment/instrument or fitness equipment.

BACKGROUND OF THE INVENTION

Learning to play an instrument or developing a skill with a piece of equipment in a sport or other, is a difficult and a time-consuming process. Most people are unaware of how much time on average is needed to reach a certain level of competency, and instead have unrealistic expectations of what to expect early on in the learning process. This results in many people giving up.

Teachers can offer a level of motivation and give people realistic expectations for what to expect and how long things should take, but in many cases people do not have teachers and instead learn alone.

It is commonly accepted that 10,000 hours is required for mastery of a skill. If people were made more aware of how far away they are from this goal, this may encourage them to practice more frequently. Furthermore, the hours required to reach competency in a skill is significantly less, yet this value is still unknown to many. Being able to provide users with realistic expectations of what to expect after 10, 50, 100 hours or more of practice, will give a learner something more tangible to aim for.

Current means of tracking such information requires users to actively track the regularity and duration of their practicing with a timer or watch and record the values manually. This is hard to remember to do, and easily forgotten despite being extremely beneficial. It is also very hard for a user to make sense of data they have tracked and relate it to any goals or compare data to anyone who have already been through a similar learning journey and succeeded. Current solutions are too simplistic and cannot accurately track a user practising and therefore the data produced is not accurate or reflective of the work done. Many factors other than sound are required to ensure a false positive in detection has not been achieved. In addition, the devices themselves do not immediately display duration of practice, which is crucial for motivation to practice further.

BRIEF SUMMARY OF THE INVENTION

According to the present invention there is provided a multi-factor verification timing and displaying system comprising: a device attached to the equipment arranged to automatically track and display timing data comprising; a microcontroller with non-volatile memory; a display; at least one button; a vibration sensor in communication with said microcontroller; a accelerometer and gyroscope in communication with said microcontroller; a light sensor arranged to sense visible and non-visible spectrum light in communication with said microcontroller; an antenna in communication with said microcontroller; a power source; and an adjustable mount; wherein the microcontroller is designed to detect data on the usage time of the equipment the device is attached to and store such data to non-volatile memory, and display on the display; wherein the accelerometer and gyroscope is configured to detect motion of the device; wherein the light sensor is configured to detect if the equipment is being stored; wherein the light sensor is configured to detect the proximity of a warm body; wherein the vibration sensor is configured to detect vibrations pertaining to the equipment being in use; wherein said display visually communicates time and data for the device; wherein at least one button allows the user to change a time period in which to view the timing data; wherein the device comprises a detachable mount for the equipment; wherein the antenna provides a means of communicating timing data remotely; and wherein the microcontroller’ detection of usage of the equipment, is in order of priority; (a) Activation of the device from low power sleep via sound stimulation from the piezo vibration sensor; (b) Piezo vibration sensor data analysis to ensure sound is indicative of use by comparing sound data to a database of reference values; (c) motion sensor data analysis to ensure motion data indicative of use by comparing to a database of reference values; (d) motion data compared to sound data to detect correlations expected when the equipment is in use; (e) Light sensor motion analysis to ensure environmental conditions are indicative of a normal use case for using the equipment (f) Confirmation from all sensors of expected use conditions in this order to begin the timer and periodic re-evaluation to ensure the device remains in use wherein once any data differs in a predefined margin the device will power down; wherein said microcontroller is enabled to have different data settings for different equipment, so as to vary sensors in use, the sensors’ priority and sensitivity.

In this way the system and device of the present invention allows a user to automatically track the time invested into learning/practicing using a piece of equipment the device is attached to.

This relates to primarily to the tracking of a user using musical equipment or instruments, as well as sports equipment and is designed to be universal and adaptable to potentially other devices too. The device allows the user to see progress of invested time instantly via the inbuilt display, as well as how far away they are from any time related goals on the display at a glance.

The challenge the invention has overcome relates to accurate practice tracking of a piece of equipment in use. Depending on the equipment being tracked there are various different in use characteristics that can be used to accurately determine correct use has been detected.

To achieve this the present invention includes a vibration sensor, accelerometer/gyroscope, a light sensor (including IR spectrum), a microprocessor, a battery for power, non-volatile memory, a mounting system, an inbuilt display, an antenna with means of wireless communication and at least one button.

The device records and displays values pertaining to the duration of time practiced on the equipment the device is attached to. In addition, the invention consists of a multi-level verification process to ensure correct usage has been detected, and displays progress on the inbuilt display.

BRIEF DESCRIPTION OF DRAWINGS

The invention will now be described solely by way of example and with reference to the accompanying drawings in which:

FIG. 68 shows the potential to configure different sensor priorities for accurate detection for different use cases.

Figure 1:
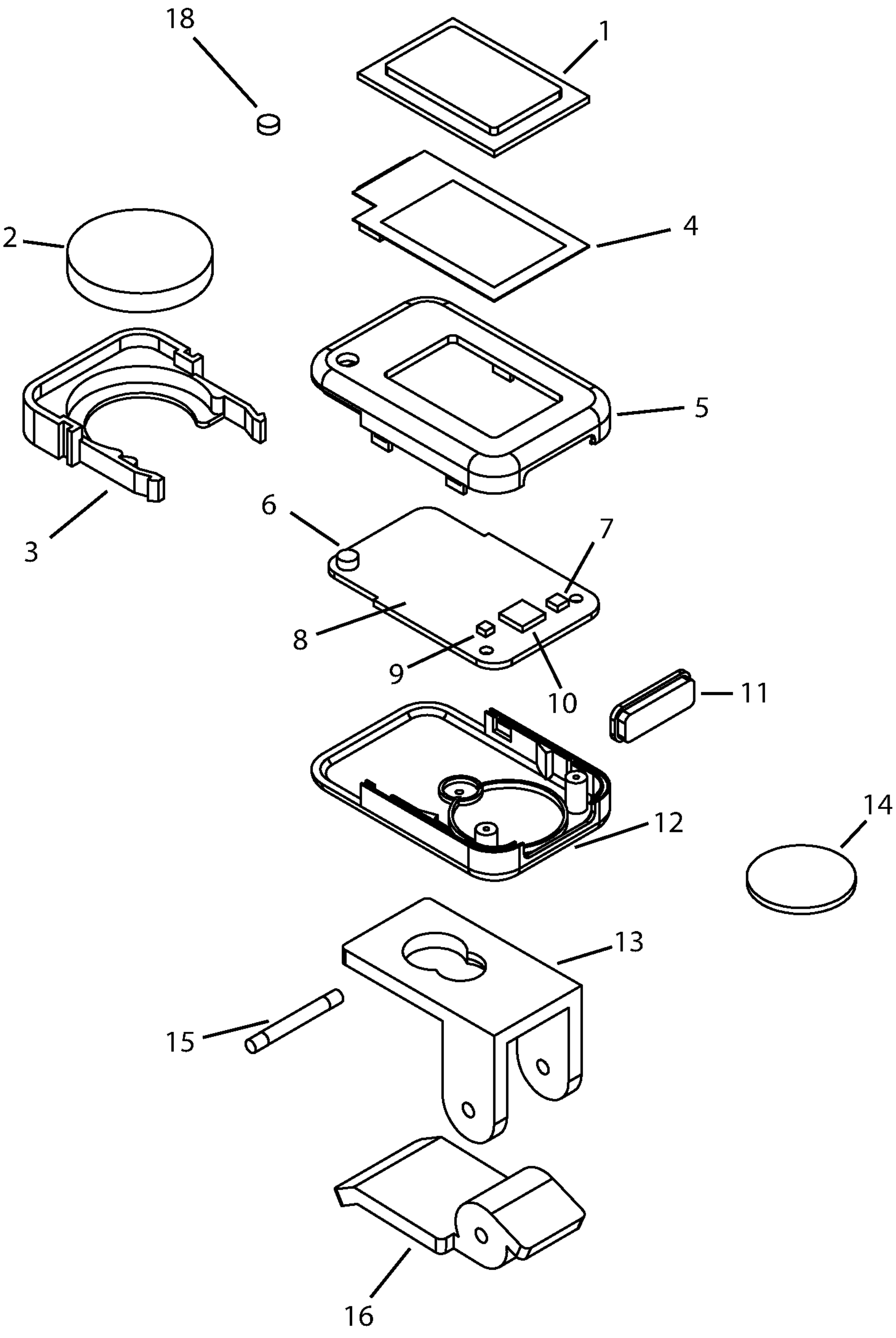
FIG. 1 shows an exploded isometric top view of the invention.
Figure 2:
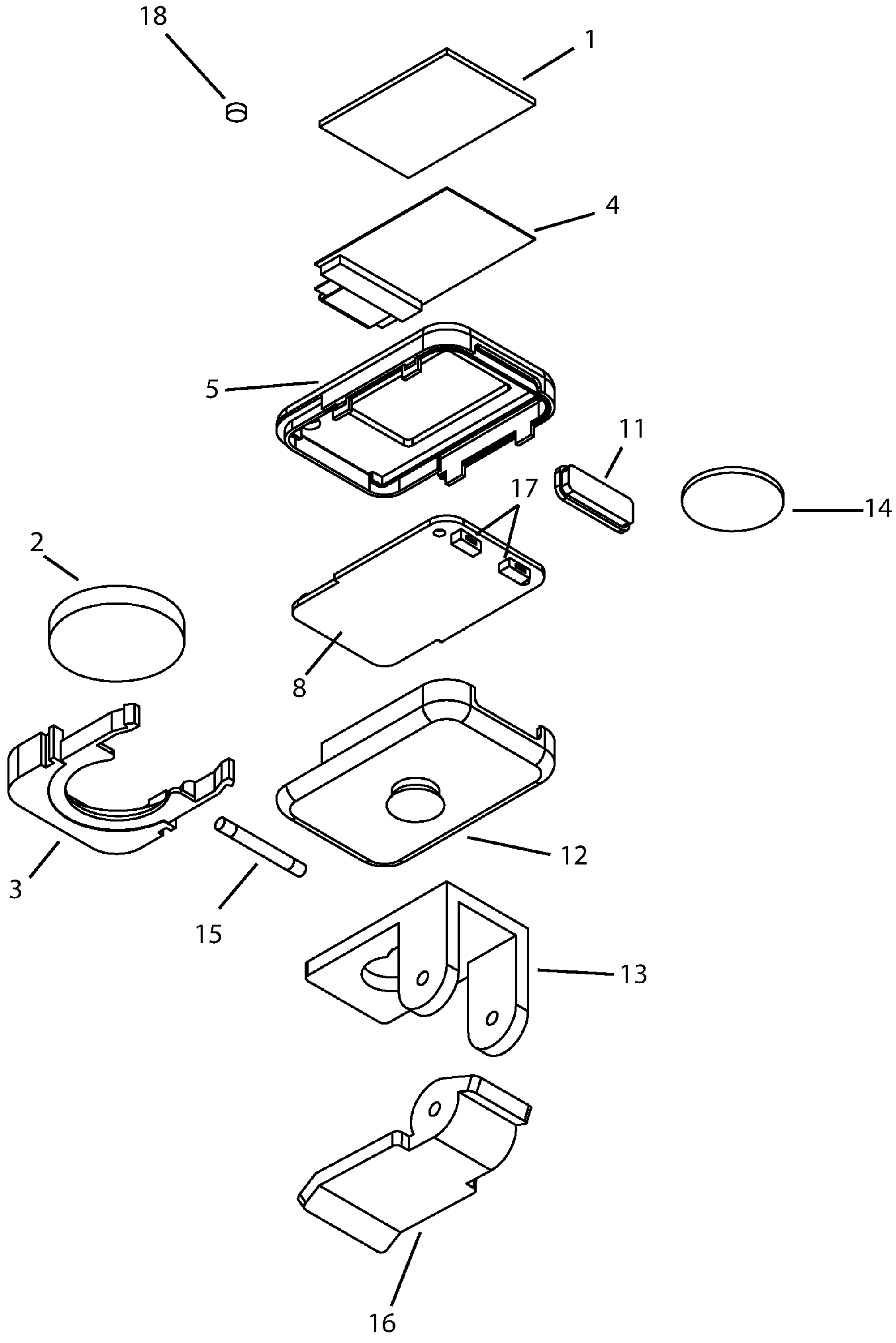
FIG. 2 shows an exploded isometric bottom view of the invention.
Figure 3:
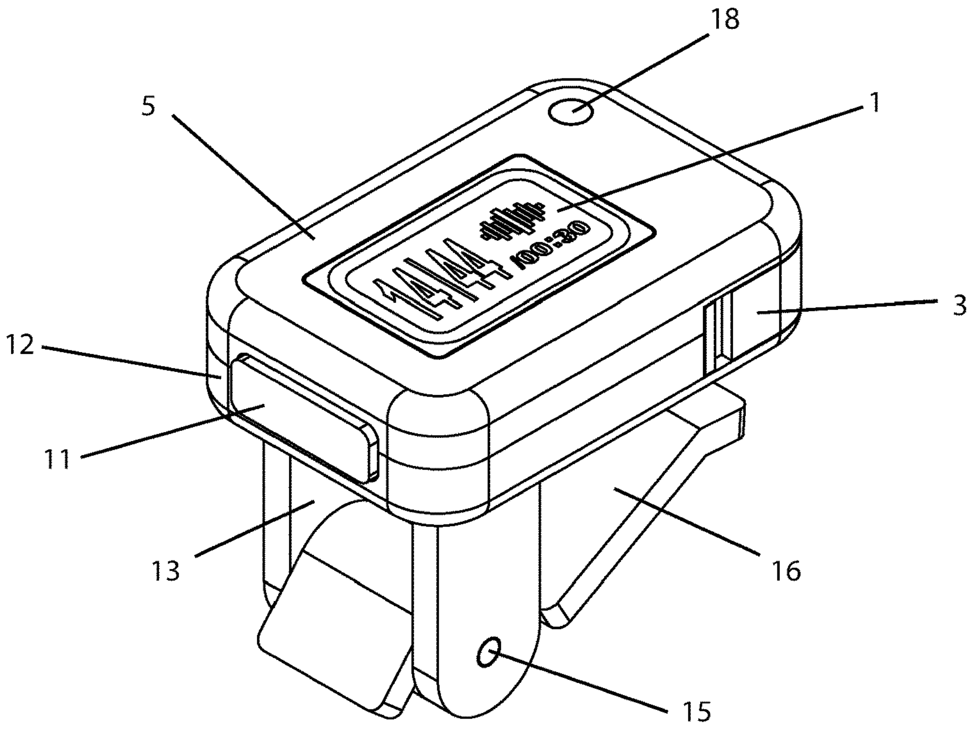
FIG. 3 shows an isometric top view of the invention.
Figure 4:
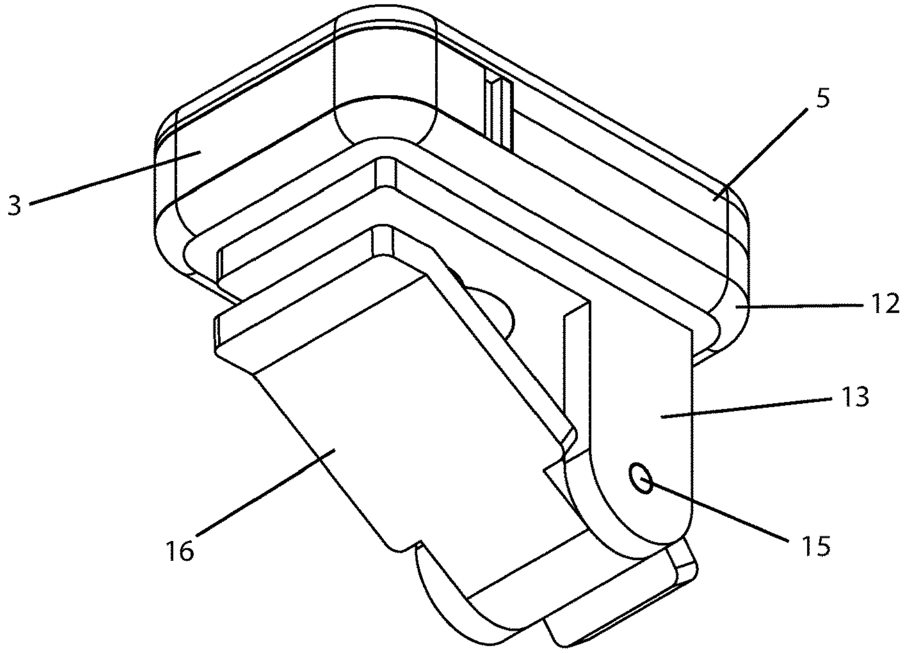
FIG. 4 shows an isometric bottom view of the invention.
Figure 5:
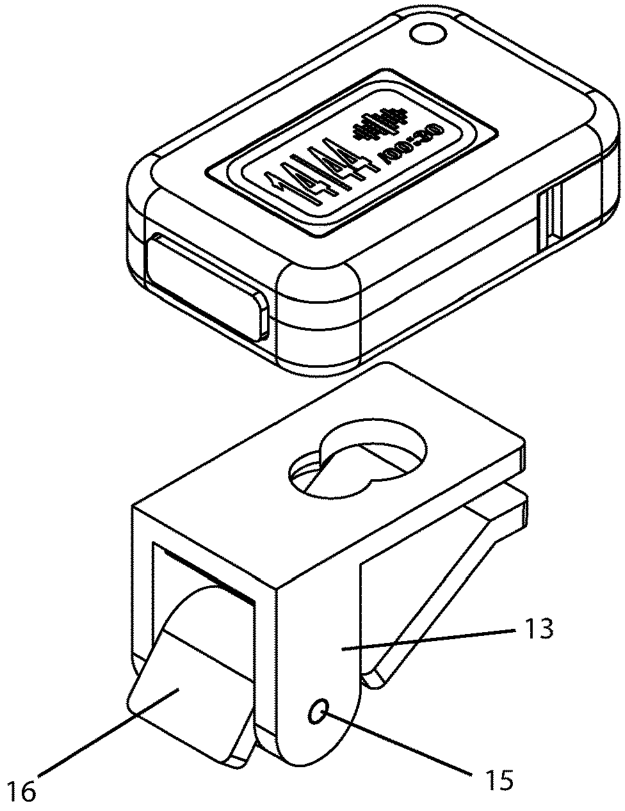
FIG. 5 shows an isometric top view of the invention with the clip mount disconnected, parts 16,13,15.
Figure 6:
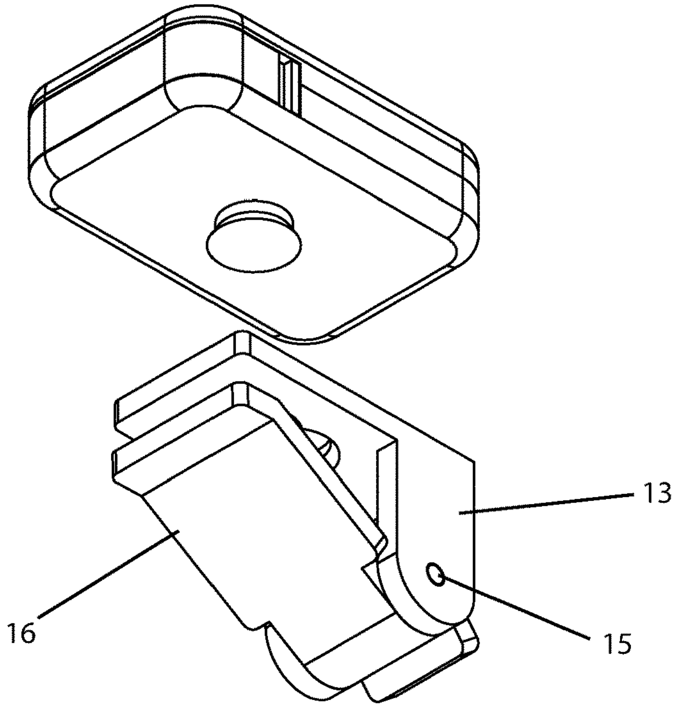
FIG. 6 shows an isometric bottom view of the invention with the clip mount disconnected, parts 16,13,15.
Figure 7:
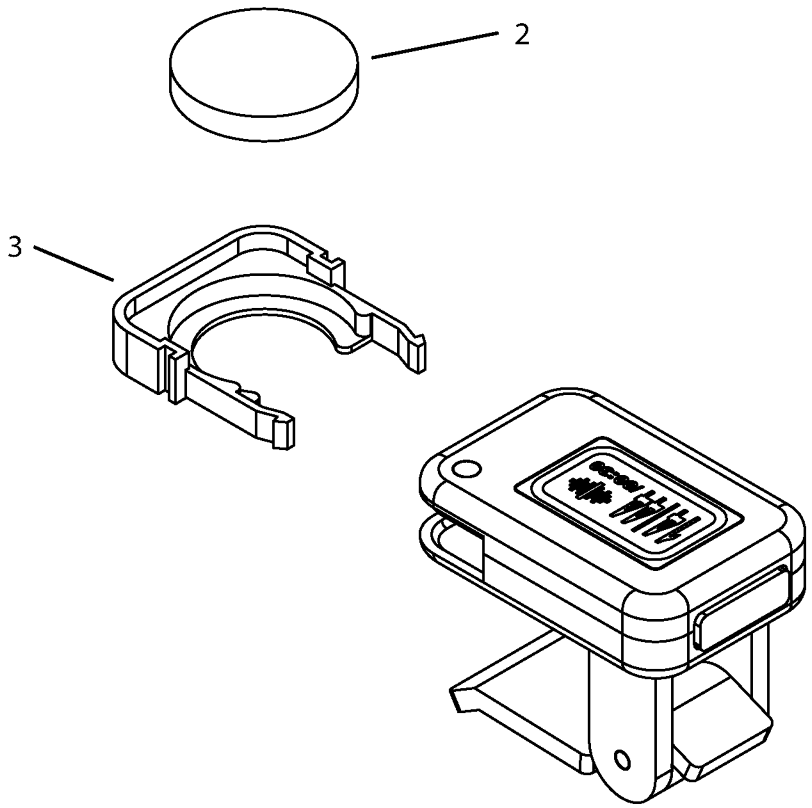
FIG. 7 shows an isometric top view of the invention with the battery sliding housing 3 removed and the coin cell battery 2 removed from the battery sliding housing 3.
Figure 8:
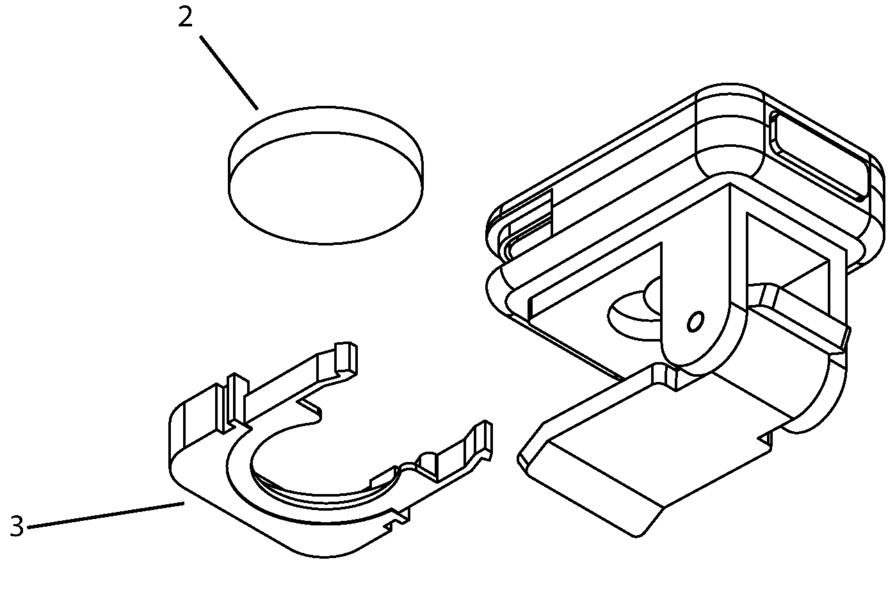
FIG. 8 shows an isometric bottom view of the invention with the battery sliding housing 3 removed and the coin cell battery 2 removed from the battery sliding housing 3.
Figure 9:
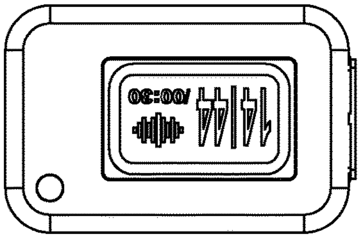
FIG. 9 shows a top view of the invention with the battery sliding housing 3 removed and the coin cell battery 2 removed from the battery sliding housing 3.
Figure 10:
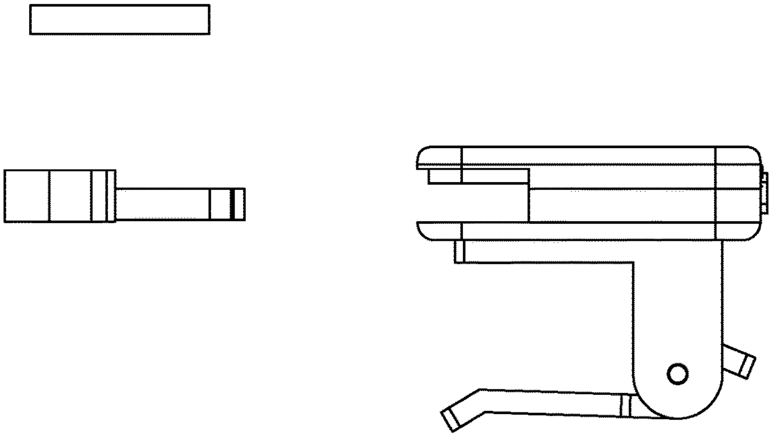
FIG. 10 shows a side view of the invention with the battery sliding housing 3 removed and the coin cell battery 2 removed from the battery sliding housing 3.
Figure 11:
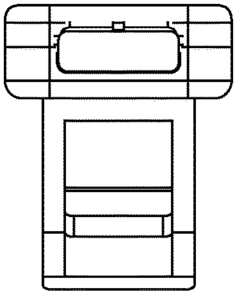
FIG. 11 shows a front of the invention with the battery sliding housing 3 removed and the coin cell battery 2 removed from the battery sliding housing 3.
Figure 12:
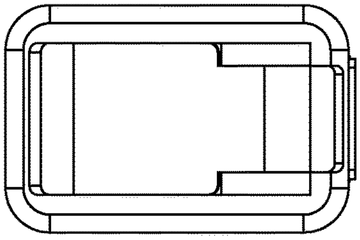
FIG. 12 shows bottom view of the invention with the battery sliding housing 3 removed and the coin cell battery 2 removed from the battery sliding housing 3.

With number declarations as follows:

1. Clear plastic screen window
2. Coin cell battery
3. Coin cell battery sliding housing
4. Display, (MIP or E-ink or Other)
5. Upper plastic casing
6. Light sensor
7. Wireless communication module
8. PCB assembly comprising of components 6,7,10,9 and 17
9. Accelerometer/gyroscope
10. Microprocessor and non-volatile memory
11. Button cap
12. Lower plastic casing
13. Clip mount
14. Piezo vibration sensor—wired to PCB
15. Clip shaft
16. Clip arm
17. Button/s
18. Light sensor plastic cap
19. Clip mount variant 2
20. Clip mount variant 3
21. Clip mount variant 4 main body
22. Clip mount variant 4 adhesive
23. Microphone
24. Tennis racket
25. Clip mount variant 4 adhesive on tennis racket
26. Guitar body
27. Clip mount variant 3 on guitar head top
28. Clip mount variant 2 on guitar head side
29. Clip mount variant 4 adhesive on side of guitar body facing the player
30. Clip mount variant 4 adhesive on front of guitar body
31. Clip mount variant 2 on piano lid
32. Clip mount variant 3 on piano lid
33. Clip mount variant 4 adhesive on front of piano
34. Clip mount variant 4 adhesive on side of stool/chair
35. Clip mount variant 2 on drum rim
36. Clip mount variant 4 adhesive on drum
37. Stool/chair
38. Piano
39. Drum
40. Cajon
41. Clip mount variant 2 on cajon opening
42. Clip mount variant 4 adhesive on back of the cajon
43. Speaker
44. Clip mount variant 4 adhesive on top of a speaker

DETAILED DESCRIPTION OF THE INVENTION

Scenario 1:—Tracking a User Practicing Using a Piece of Musical Equipment/Instrument Such as a Saxophone, Violin or Guitar Movement alone would not be sufficient to detect use of a piece of equipment but it can indicate potential use. An accelerometer/gyroscope could be used to detect motion relating to correct movement expected when playing has occurred. However, scenarios where a user may just be holding their instrument and not playing need to be accounted for. Different locations of monitoring movement can be used to increase accuracy of detection on the equipment by cross referencing motion with expected in use motion, however there may be insufficient data to fully validate use.

Similarly, solely detecting sound does not necessarily indicate the user is playing the instrument. They may be next to another user who has the same instrument and is playing, whilst they are holding their instrument about to play.

Additionally, the device maybe attached to equipment that is in a carry case or bag near places where sound and movement could trigger the device to begin. This could be on public transport, or in a case within an orchestra setting. Resonant frequencies in this case could make strings on a violin for example vibrate and produce sound themselves.

Figure 69:
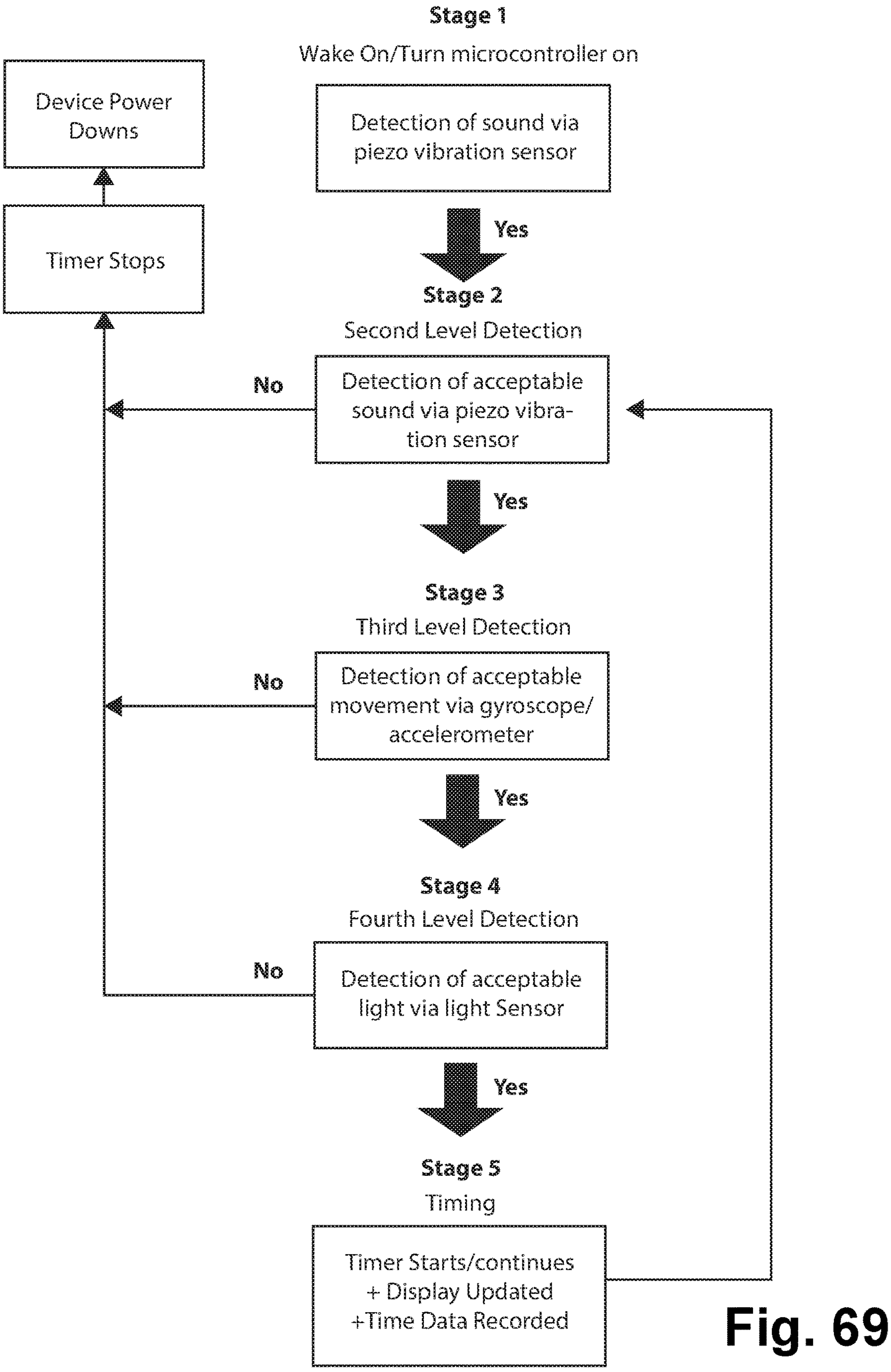
FIG. 69 shows the process flow for accurate detection for the device where sound, movement and light play a significant role in device use characteristics. Sound stimulates piezo vibration sensor in the device to wake the microcontroller from low power mode followed by sequential confirmation of in use values from the piezo vibration sensor, gyroscope/accelerometer, and light sensor to detect use.
Figure 70:
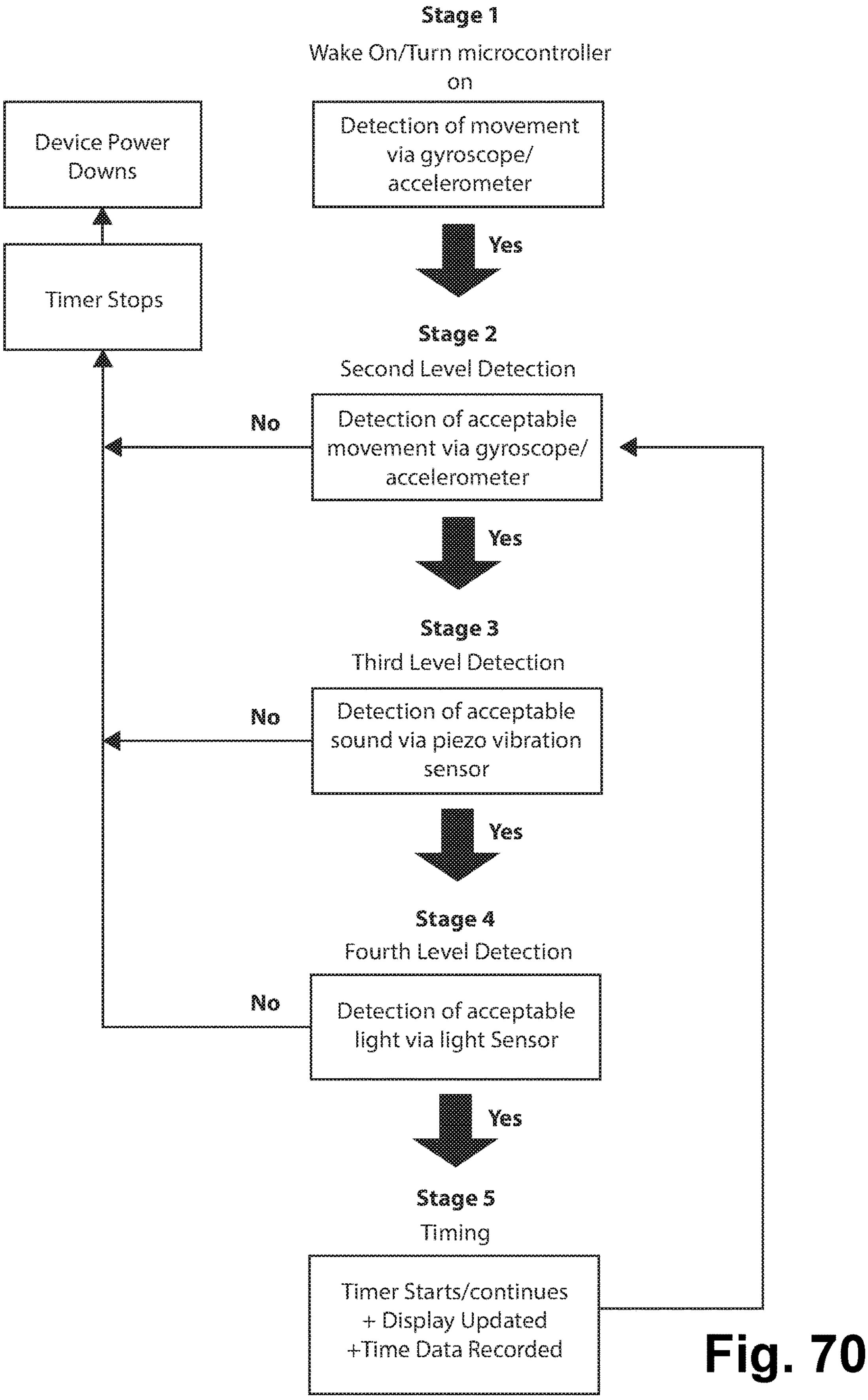
FIG. 70 shows the process flow for accurate detection for the device where sound, movement and light play a significant role in device use characteristics. Movement stimulates the device to wake the microcontroller from low power mode, followed by sequential confirmation of in use values from the gyroscope/accelerometer, piezo vibration sensor, and light sensor to detect use.
Figure 71:
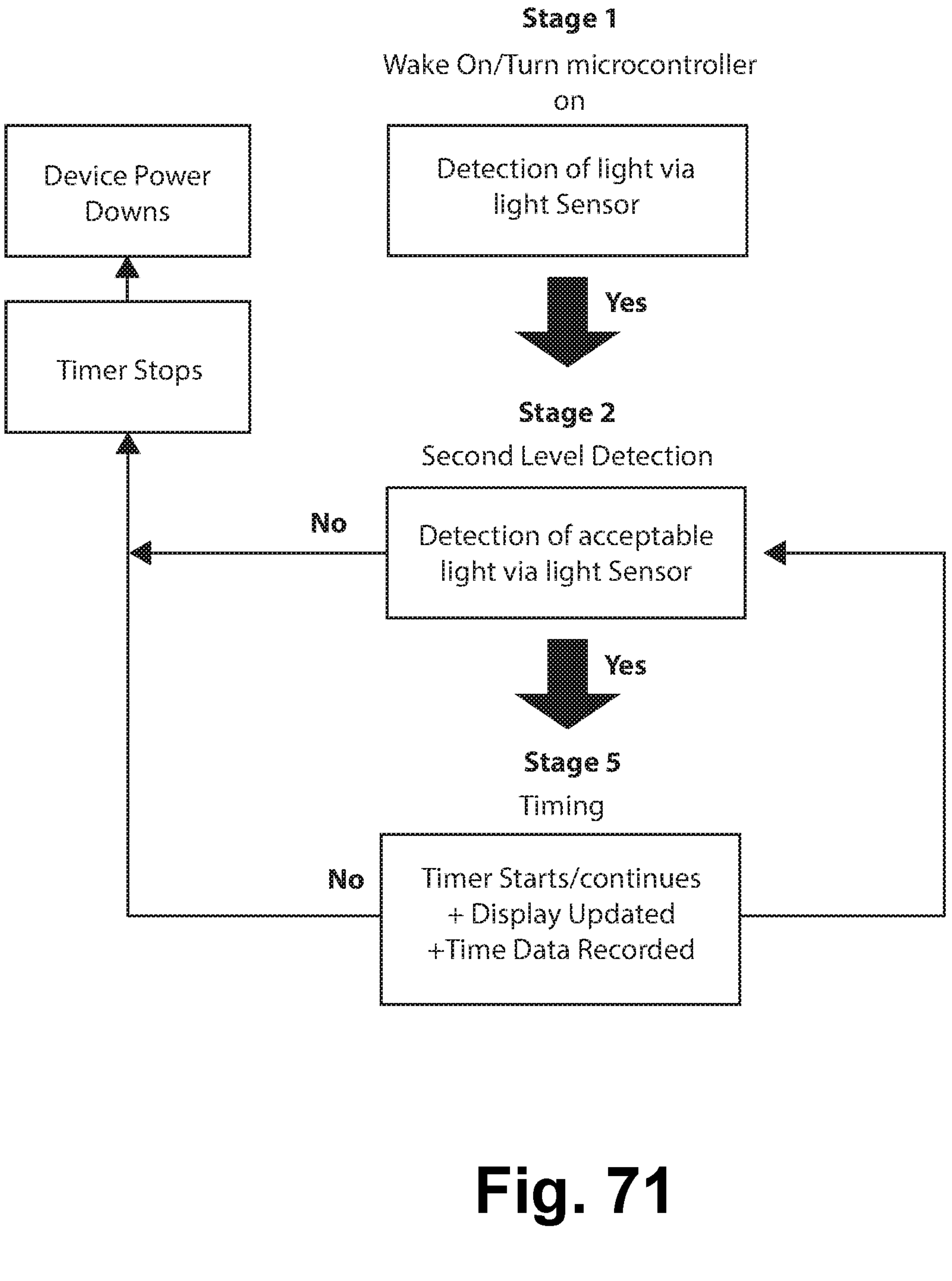
FIG. 71 shows the process flow for accurate detection for the device where vibration or sound do not vary significant or at all during device use characteristics. Light stimulates the device to the microcontroller from low power mode and is the only sensor present to keep the device activated detecting use until the sensor values moves outside the expected use range.
Figure 72:
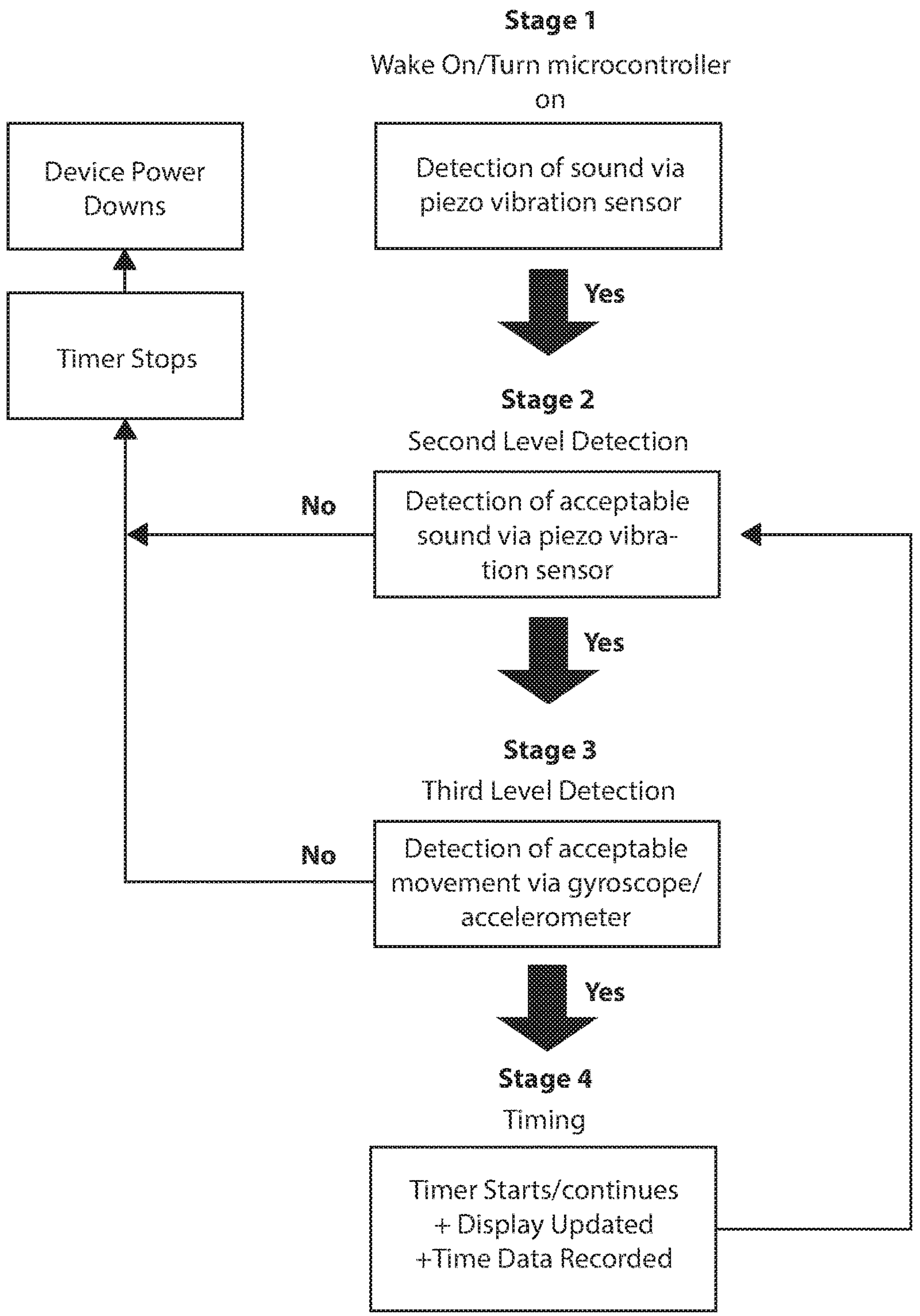
FIG. 72 shows the process flow for accurate detection for the device where sound and movement play a significant role in the device use characteristics. Sound stimulates the device to wake the microcontroller from low power mode followed by sequential confirmation of in use values from the gyroscope/accelerometer, piezo vibration sensor, and light sensor to detect use.
Figure 73:
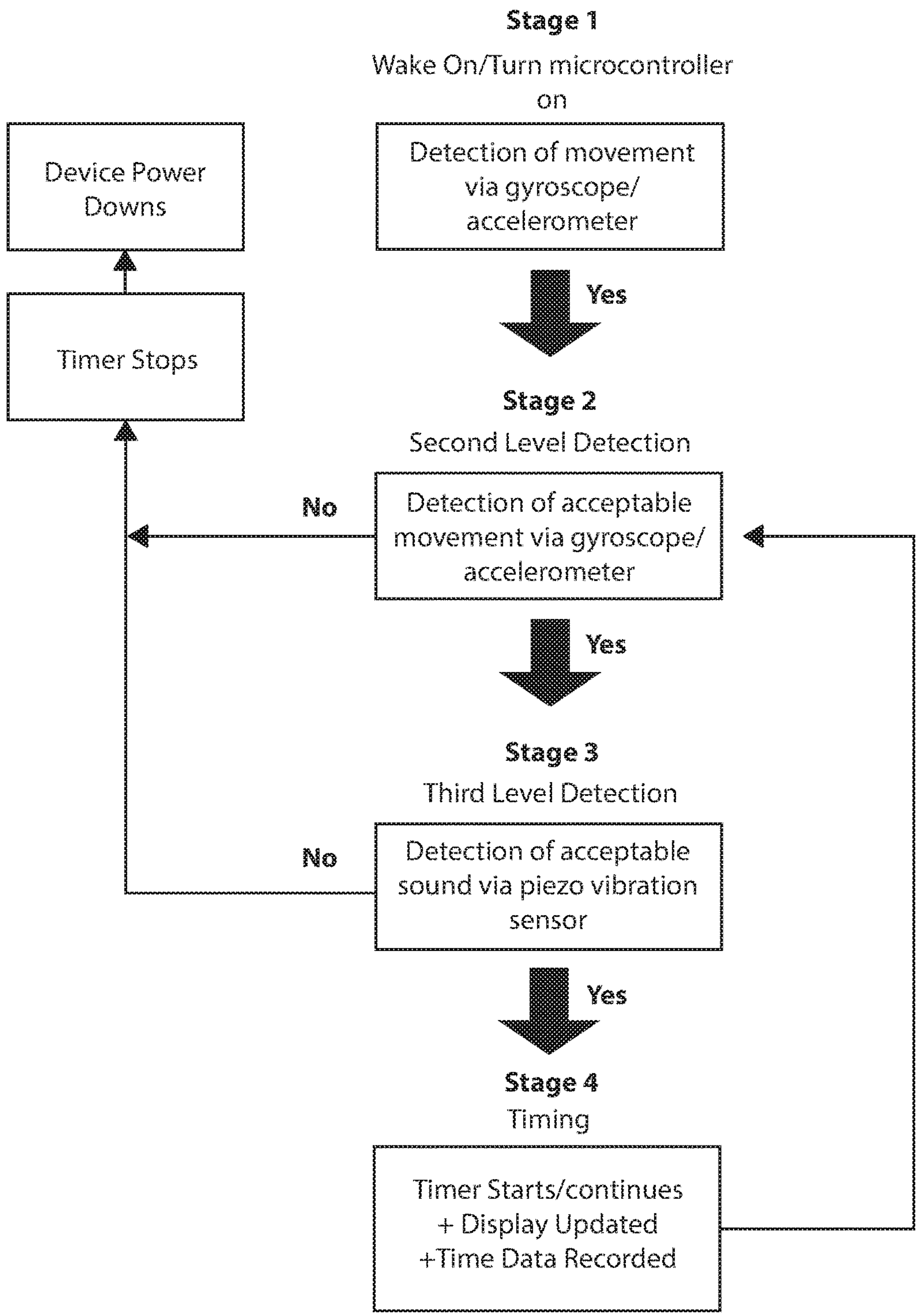
FIG. 73 shows the process flow for accurate detection for the device where only movement and sound play a significant role in the device use characteristics. Movement stimulates the device to wake the microcontroller from low power mode followed by sequential confirmation of in use values from the gyroscope/accelerometer, piezo vibration sensor to detect use.

FIGS. 69 and 70 show how the device can utilise multiple sensors for this scenario to ensure correct use has been detected. By using different sensors, the device can authenticate correct use has occurred to a high degree of accuracy. FIGS. 69 and 70 use the same sensor set, and differ in sensor priority, however the result is essentially the same. FIG. 69 demonstrates a vibration sensor to wake the device from sleep whereas FIG. 70 demonstrates using the accelerometer/gyroscope to wake the device.

FIG. 69 shows how the first sensor, the piezo vibration sensor, is used to turn the device on from a low power sleep, when sound is detected. This is then followed by a more sophisticated analysis of the sound detected by the piezo vibration sensor. This consists of comparing the sound data received from the piezo vibration sensor to expected sound data values from datasets relating to the equipment the device is connected to. These would either be selected via the app to calibrate the device or via on the device itself.

This is then followed by analysing the movement characteristics of the equipment via the accelerometer/gyroscope sensor and comparing this outputted data to expected movement datasets for the piece of equipment the device is attached to. In addition, the sensor output data is compared to values from the piezo vibration sensor to identify if the production of sound relates to any notable movement. For example; this could be the movement that resulted from strumming a guitar, compared to a notable increase in sound at exactly the same point of time as the strum. This increases confidence that the user is actually playing the instrument or using the piece of equipment.

Finally, movement and the production of sound via external means can occur when transporting equipment. Equipment being knocked/moved also produces sound in such scenarios. In most occasions however, equipment such as this are normally placed in a cases or bags. This use case has one thing in common and that is, no light. Therefore, a light sensor is used to detect if the device is bagged/stored and helps prevent unwanted tracking from occurring when equipment is being transported. Furthermore, this sensor can validate use further by detecting the proximity of a warm body via emitted infrared radiation relating to that of a human nearby.

With these sensors uniquely configured together in this specific way accuracy of detection will be high and potential to trick or accidentally trick the system will be extremely low. At any stage if the values from each sensor are not what is expected the device will power down after a period of time.

The device can also record these sensor values to optimize accurate detection and learn to better track the user by correlating learnt values.

This device is intended to last for 1-2 years before replacing the battery or charging so efficient accuracy of detection is essential in the invention to ensure this. This is why there is a low power wake stage to prevent the microprocessor continually running.

Scenario 2: Custom Tracking

Some pieces of equipment required to be tracked may not have similar in use conditions such as the use case scenario described in scenario 1. A user may want to track a piano, drum set, microphone, chair etc. which all have different conditions of use that could be used for tracking.

Figure 68:
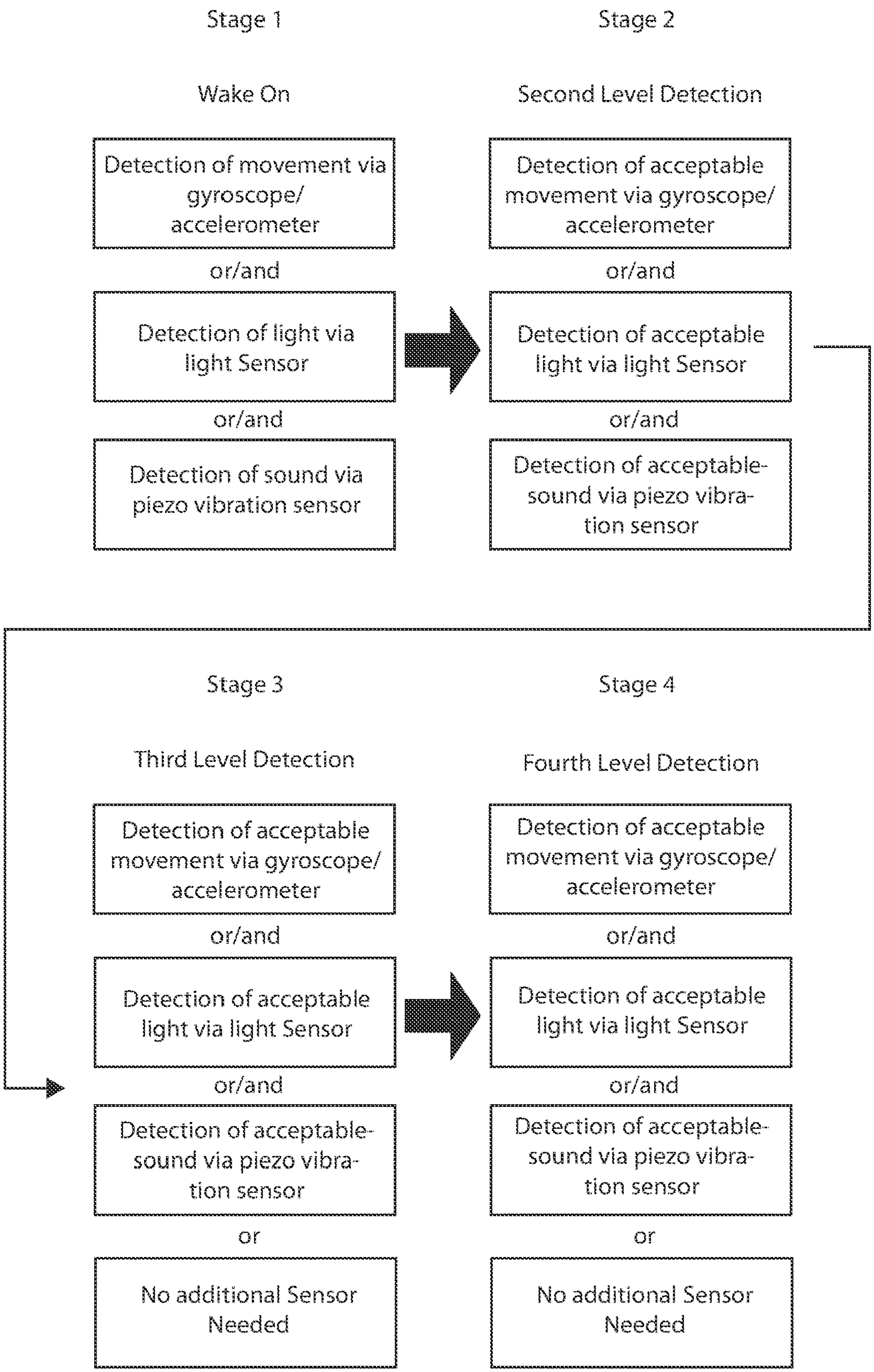
FIG. 68 shows the multiple different ways the device can detect if use of the piece of equipment has occurred. This figure should be viewed with FIG. 75 and FIG. 76 which shows examples of paths that would be appropriate for the detection of a guitar being in use.

In these instances, the device can allow for different detection settings with different priorities. FIG. 68 outlines the different options of stages of verification to detect use. Via the app or on the device the user can select different pre-sets that relate best to the object they are tracking use of. In addition, the user can create their own pre-sets by selecting which sensors are used, priorities of sensor order and sensor sensitivity. FIGS. 69, 70, 71, 72, 73, 74, 75 highlight some options a user could program.

Figure 74:
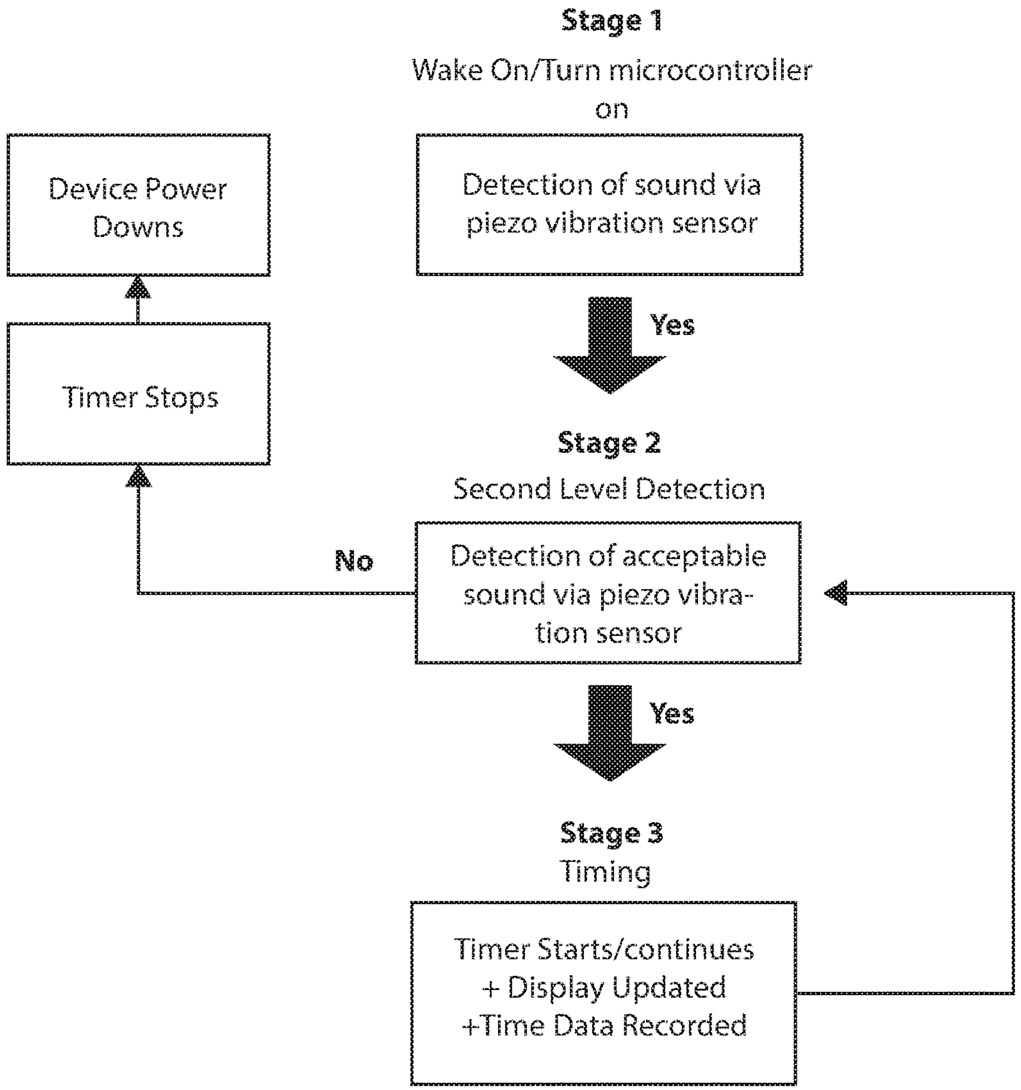
FIG. 74 shows the process flow for accurate detection for the device where only sound plays a significant role in the device use characteristics. Sound stimulates the device to wake the microcontroller from low power mode via the piezo vibration sensor, followed by confirmation of in use values from the piezo vibration sensor to detect use.
Figure 75:
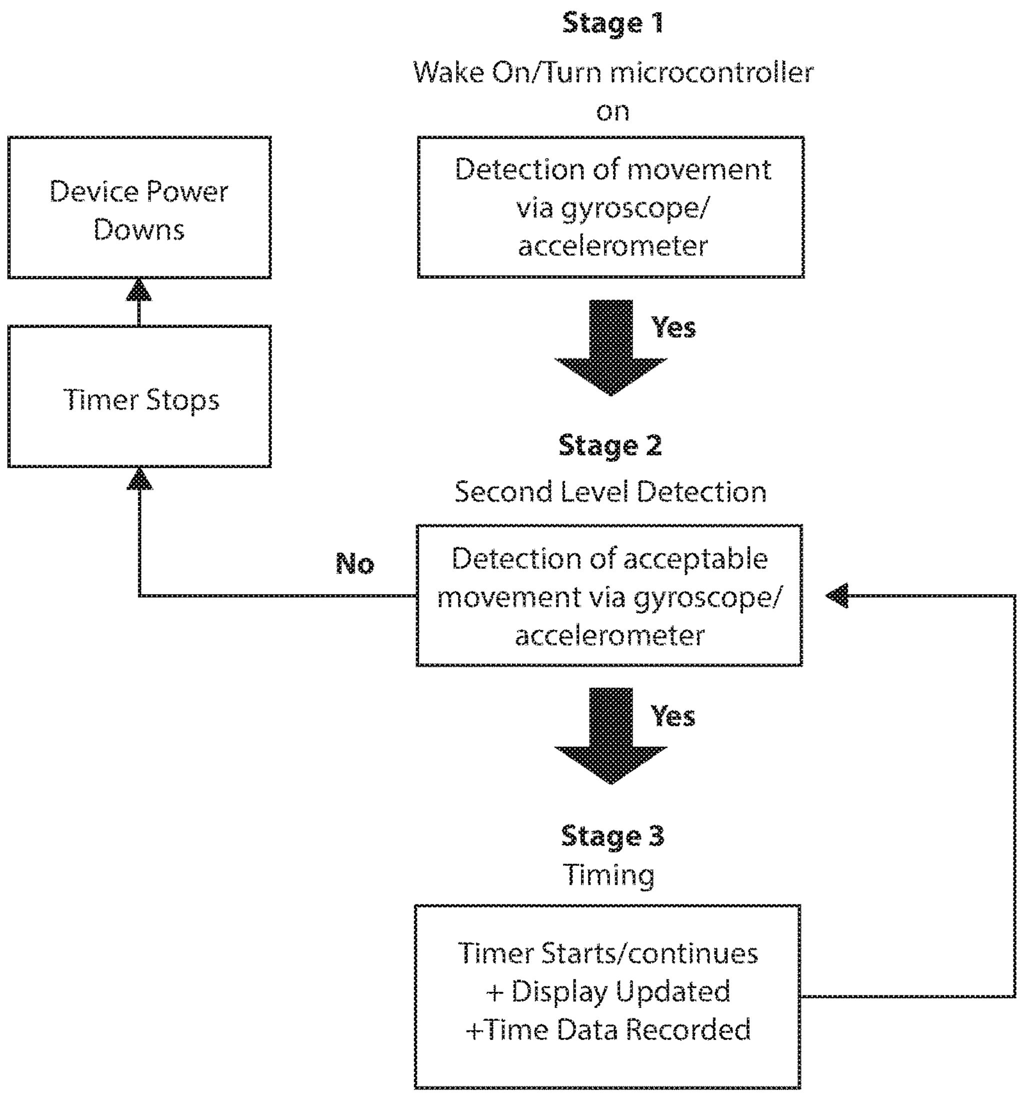
FIG. 75 shows the process flow for accurate detection for the device where only movement plays a significant role in the device use characteristics. movement stimulates the device to wake the microcontroller from low power mode via the accelerometer/gyroscope sensor, followed by confirmation of in use values from the accelerometer/gyroscope sensor to detect use.
Figure 76:
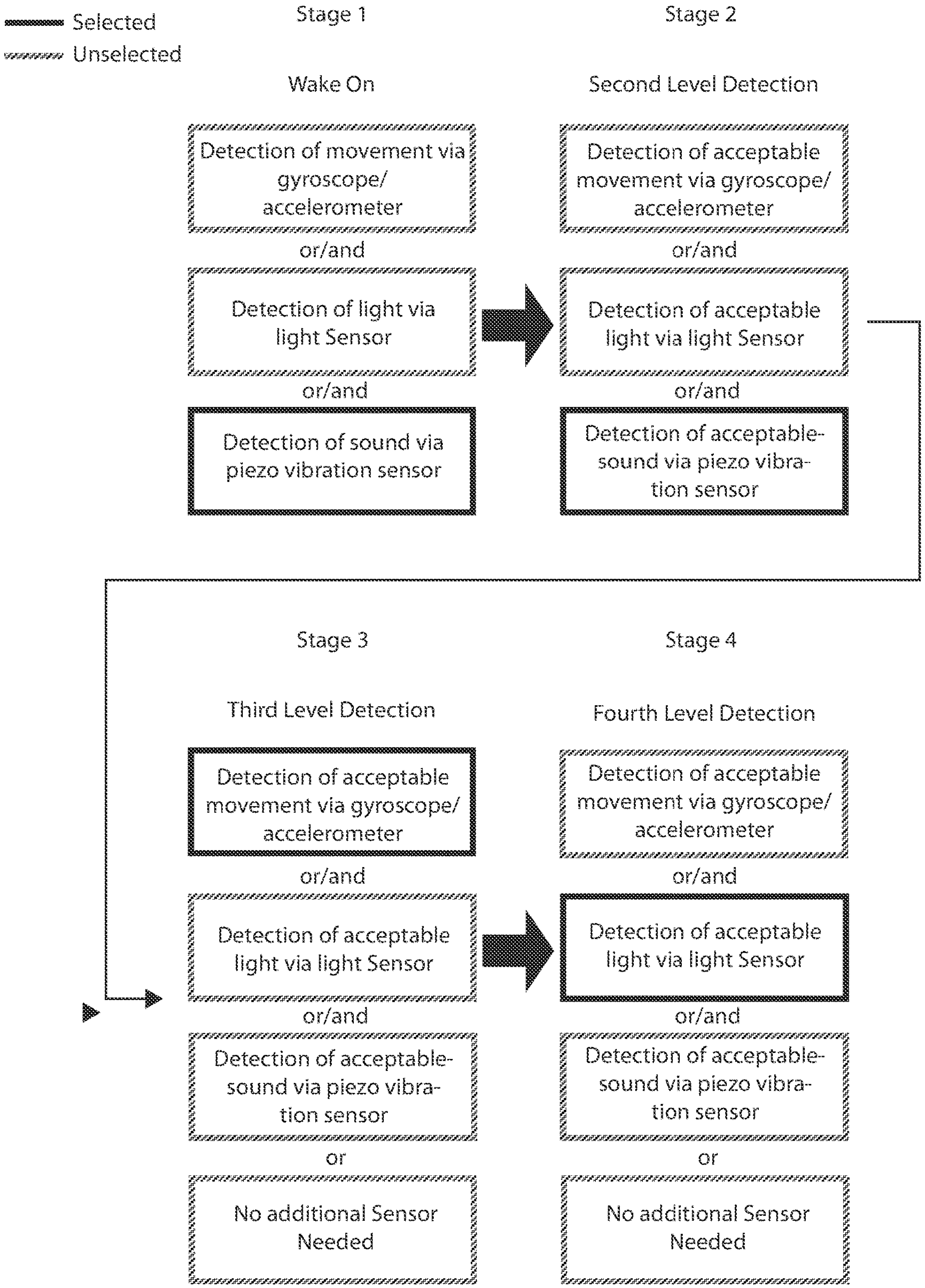
FIG. 76 shows the process flow for accurate detection for the device where sound, movement and light play a significant role in device use characteristics. Sound stimulates piezo vibration sensor in the device to wake the microcontroller from low power mode followed by sequential confirmation of in use values from the piezo vibration sensor, gyroscope/accelerometer, and light sensor to detect use.
Figure 77:
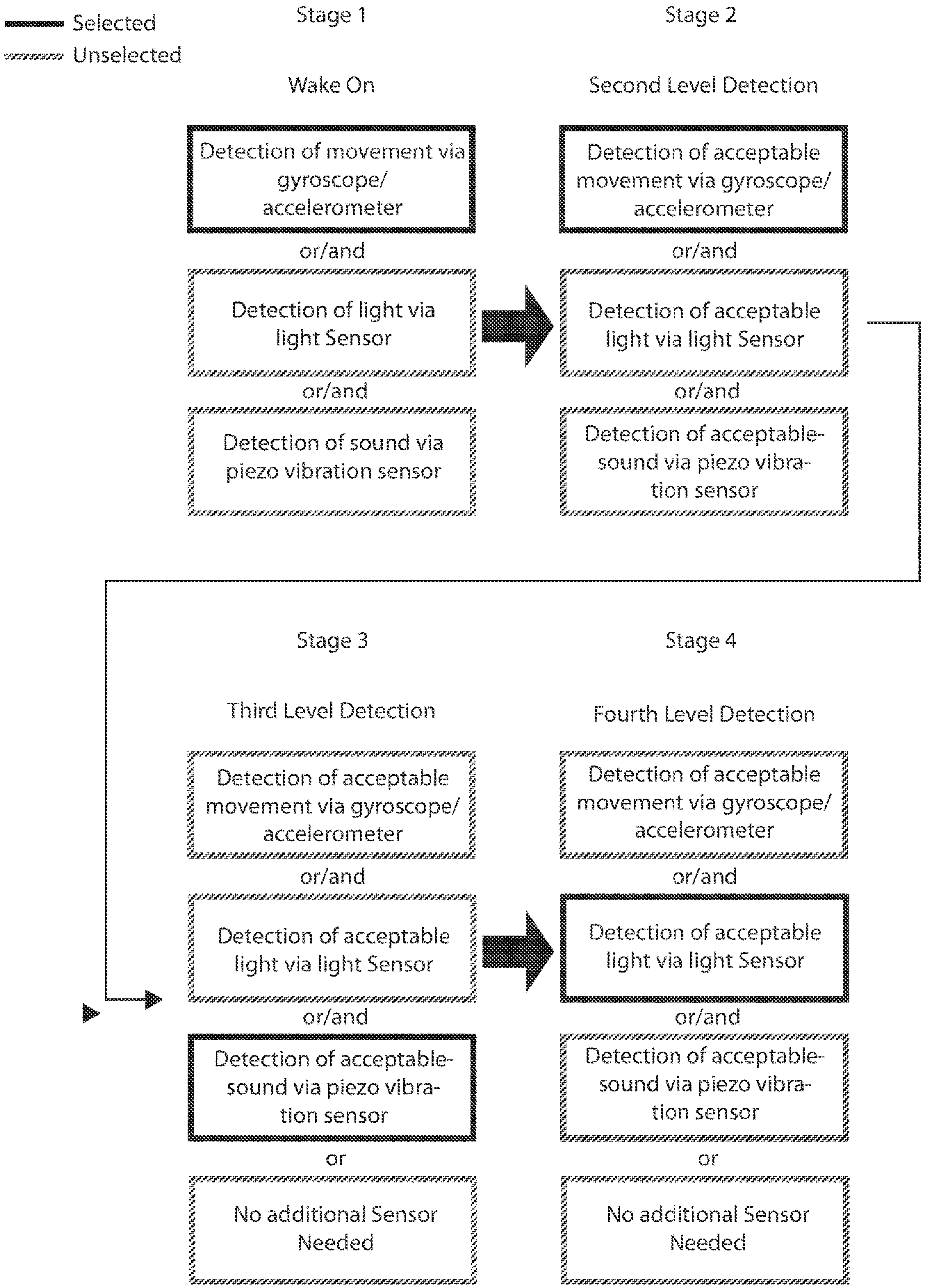
FIG. 77 shows the process flow for accurate detection for the device where sound, movement and light play a significant role in device use characteristics. Movement stimulates the device to wake the microcontroller from low power mode, followed by sequential confirmation of in use values from the gyroscope/accelerometer, piezo vibration sensor, and light sensor to detect use.
Figure 78:
FIG. 78 showing the landscape display graphics for tracking activity during use view.
Figure 79:
FIG. 79 showing the portrait display graphics for tracking activity during use view.
Figure 80:
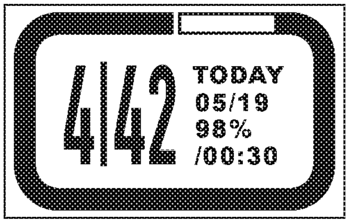
FIG. 80 showing the portrait display graphics for the Today view.
Figure 81:
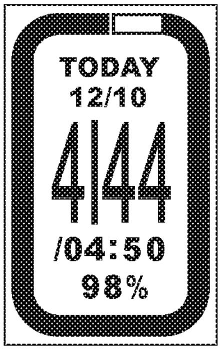
FIG. 81 showing the landscape display graphics for the Today view.
Figure 82:
FIG. 82 showing the portrait display graphics for the Week view.
Figure 83:
FIG. 83 showing the landscape display graphics for the Week view.
Figure 84:
FIG. 84 showing the portrait display graphics for the Month view.
Figure 85:
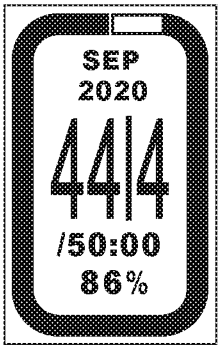
FIG. 85 showing the landscape display graphics for the Month view.
Figure 86:
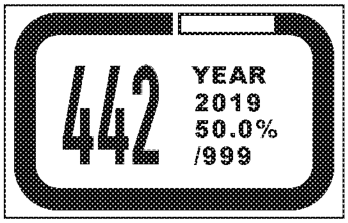
FIG. 86 showing the portrait display graphics for the Year view.
Figure 87:
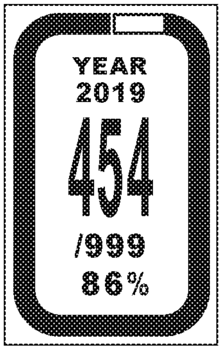
FIG. 87 showing the landscape display graphics for the Year view.
Figure 88:
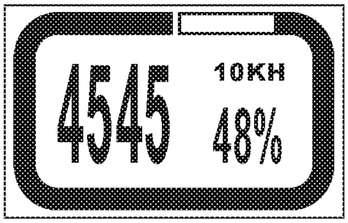
FIG. 88 showing the portrait display graphics for the 10,000 hour view.
Figure 89:
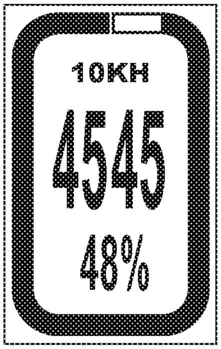
FIG. 89 showing the landscape display graphics for the 10,000 hour view.
Figure 90:
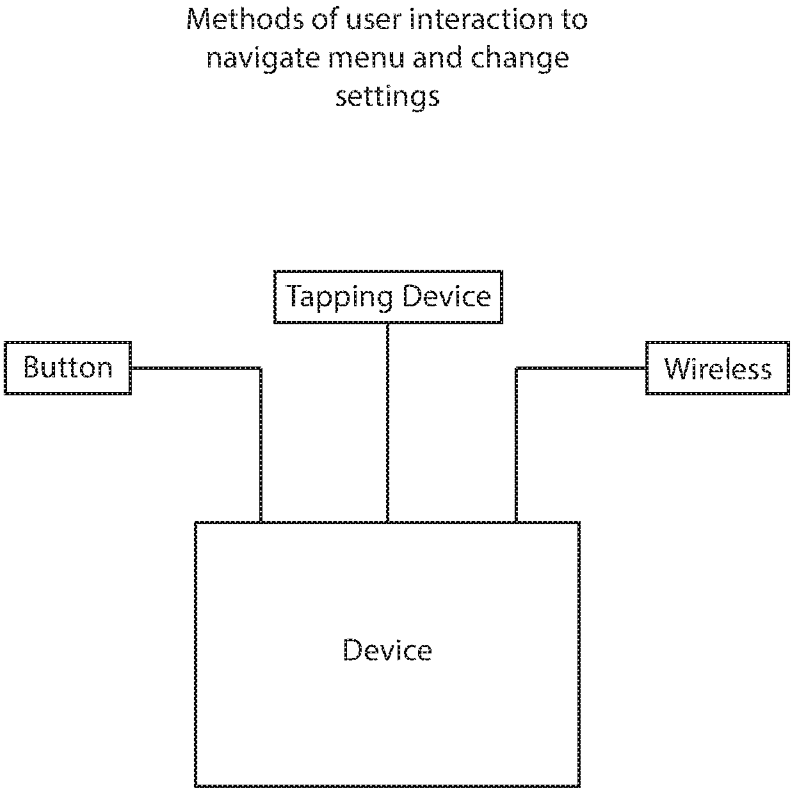
FIG. 90 showing different methods of interacting with the device, from remote control via a smart device such as a smartphone, buttons on the device via a press, and via detecting tapping on the device using the accelerometer/gyroscope or piezo vibration sensor.

For example, if a user wanted to track time spent in a music producing studio. Movement would most likely not be a variable worth tracking, and neither would light in the visible spectrum, however sound is. This would mean a user could select a pre-set solely dependent on sound and calibrate the sensitivity to only pick up the output of one of the main speakers in the room. FIG. 74 shows the configuration needed for such scenario.

Mounting:

The device is designed to be mounted to equipment in numerous ways. The device can connect to at least four different types of mount that allow for different mounting scenarios.

Figure 39:
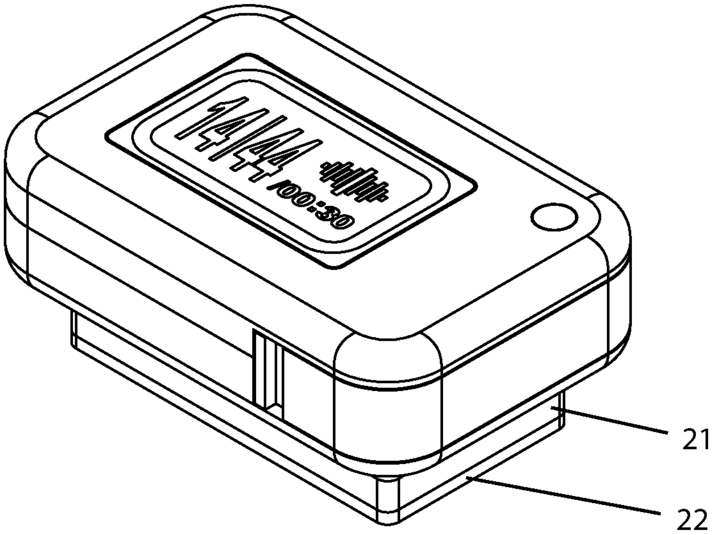
FIG. 39 shows an isometric top view of the invention with an alternative clip design 21,22 that relies an adhesive to mount the device on pieces of equipment such as positions 30,29 in FIG. 53, position 28 in FIG. 48, as described in FIG. 46, FIG. 55 in position 33,34, FIG. 62, FIG. 63 position 42 and FIG. 65 position 44.
Figure 40:
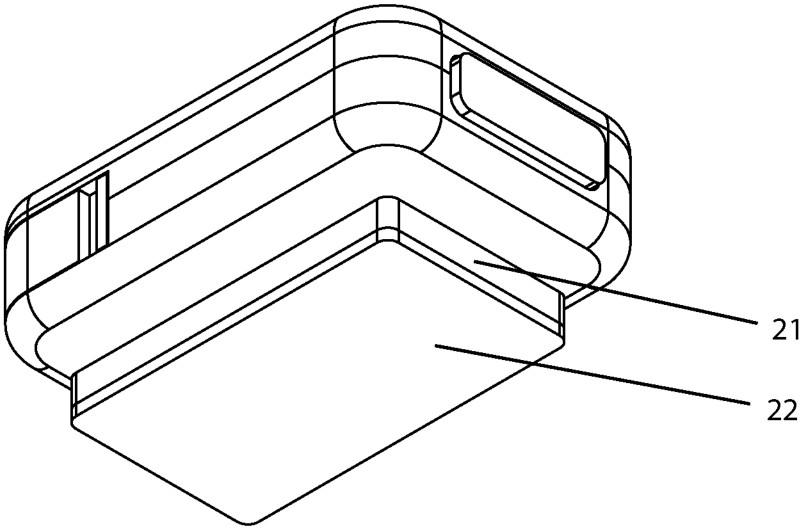
FIG. 40 shows an isometric bottom view of the invention with an alternative clip design 21,22 that relies an adhesive to mount the device on pieces of equipment such as positions 30,29 in FIG. 53, position 28 in FIG. 48, as described in FIG. 46, FIG. 55 in position 33,34, FIG. 62, FIG. 63 position 42 and FIG. 65 position 44.
Figure 41:
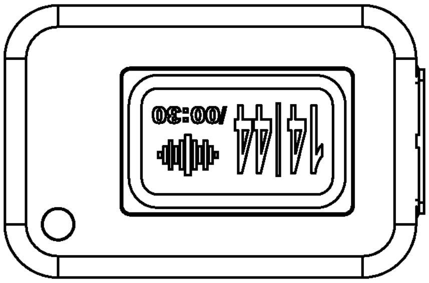
FIG. 41 shows a top view of the invention with alternative clip design 21,22.
Figure 42:
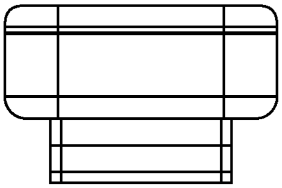
FIG. 42 shows a left side view of the invention with alternative clip design 21,22.
Figure 43:
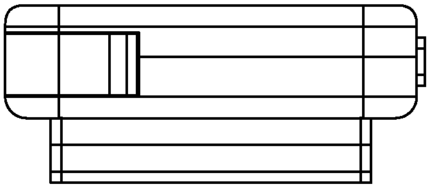
FIG. 43 shows a front view of the invention with alternative clip design 21,22.
Figure 44:
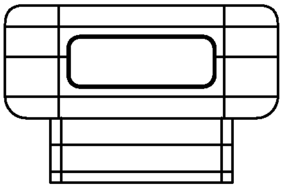
FIG. 44 shows a right side view of the invention with alternative clip design 21,22.
Figure 45:
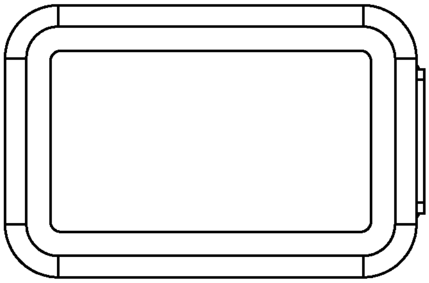
FIG. 45 shows a bottom side view of the invention with alternative clip design 21,22.
Figure 46:
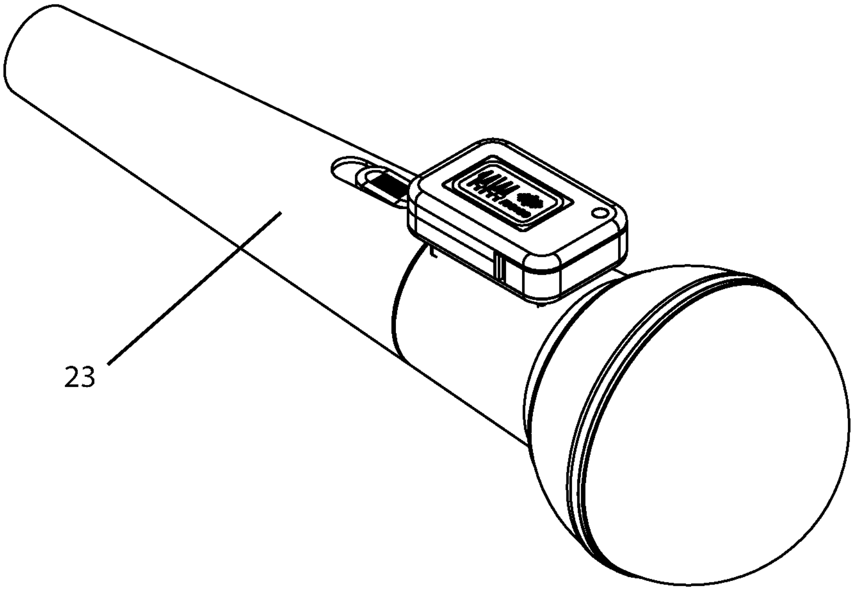
FIG. 46 shows an isometric top view of the invention mounted to a microphone.
Figure 47:
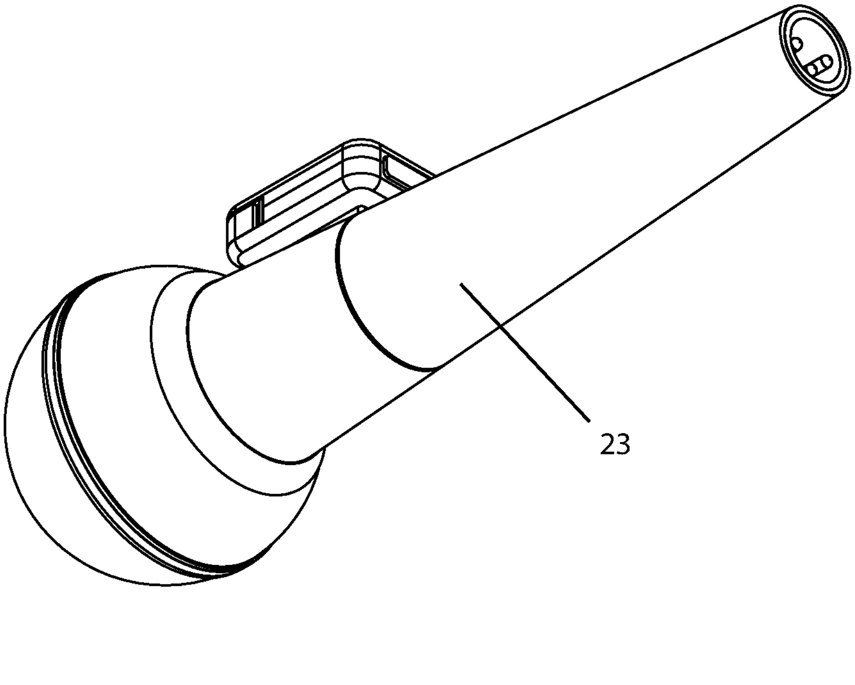
FIG. 47 shows an isometric bottom view of the invention mounted to a microphone.
Figure 48:
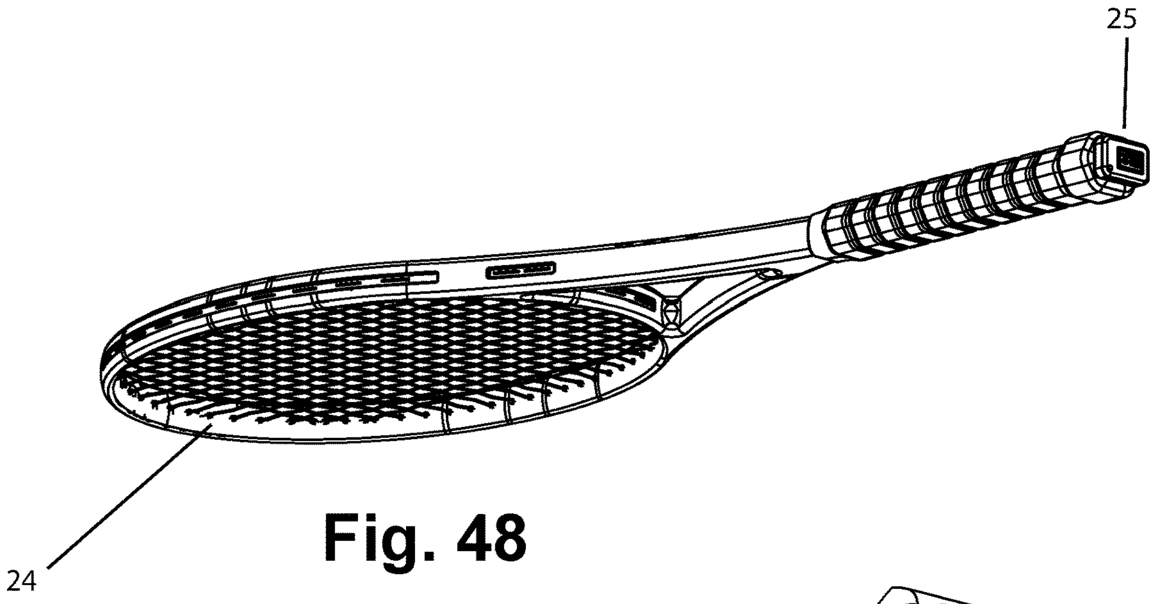
FIG. 48 shows an isometric top view of the invention mounted to a tennis racket.
Figure 49:
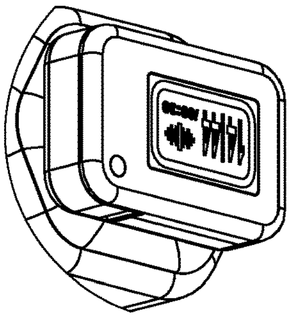
FIG. 49 shows an detailed view of the invention mounted to a tennis racket.
Figure 50:
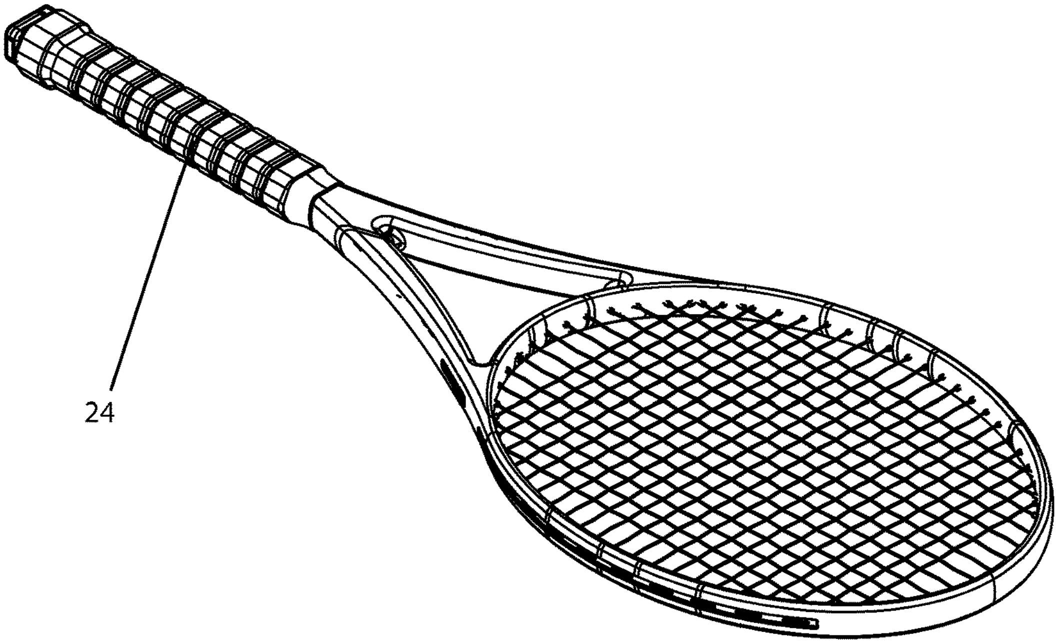
FIG. 50 shows an isometric bottom view of the invention mounted to a tennis racket.
Figure 51:
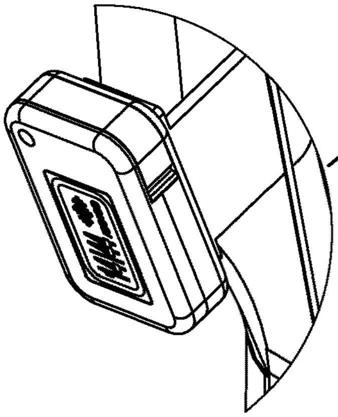
FIG. 51 shows a detailed view of the invention mounted to a guitar using mount 19.
Figure 52:
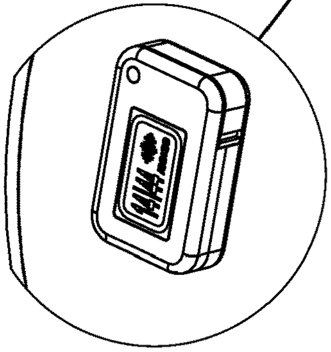
FIG. 52 shows a detailed view of the invention mounted to a guitar using adhesive mount 21,22.
Figure 53:
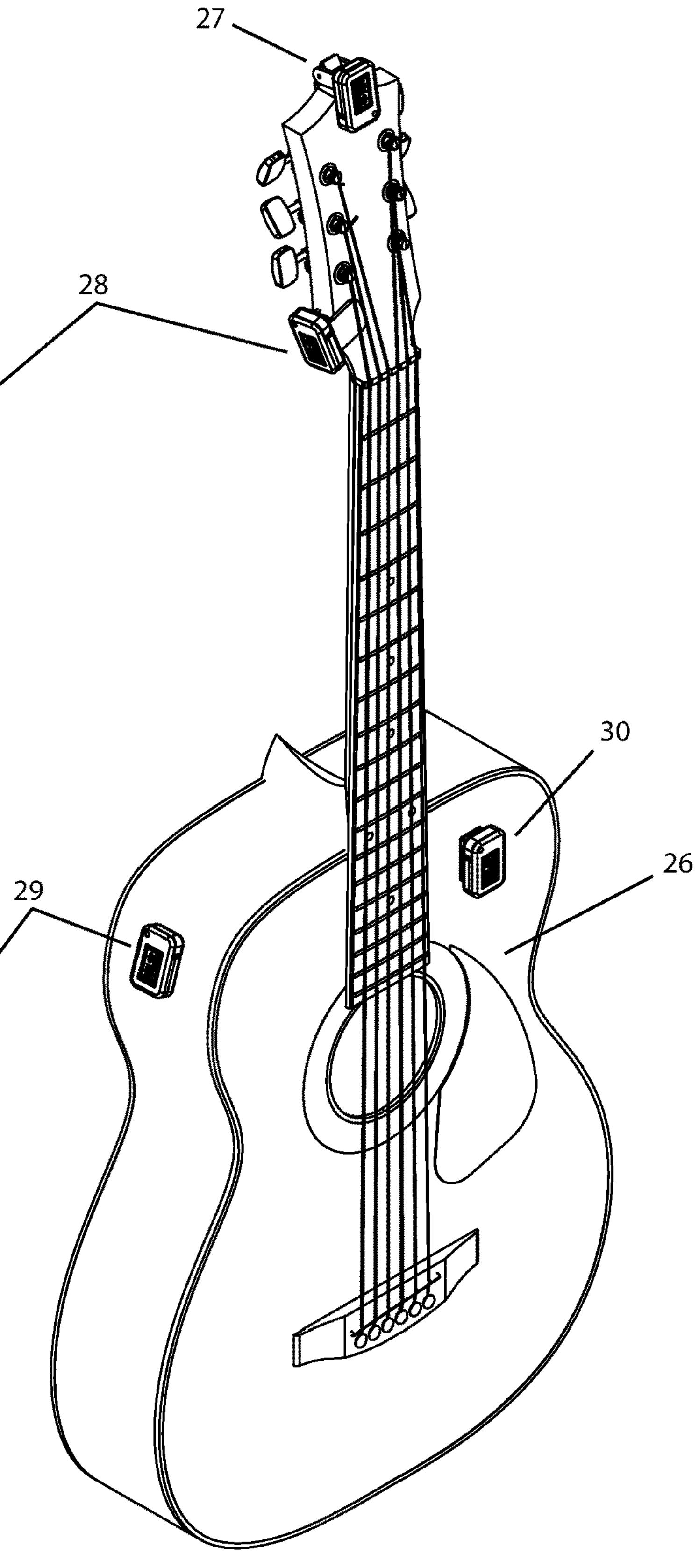
FIG. 53 shows an isometric top view of the invention mounted in numerous locations on a guitar.
Figure 54:
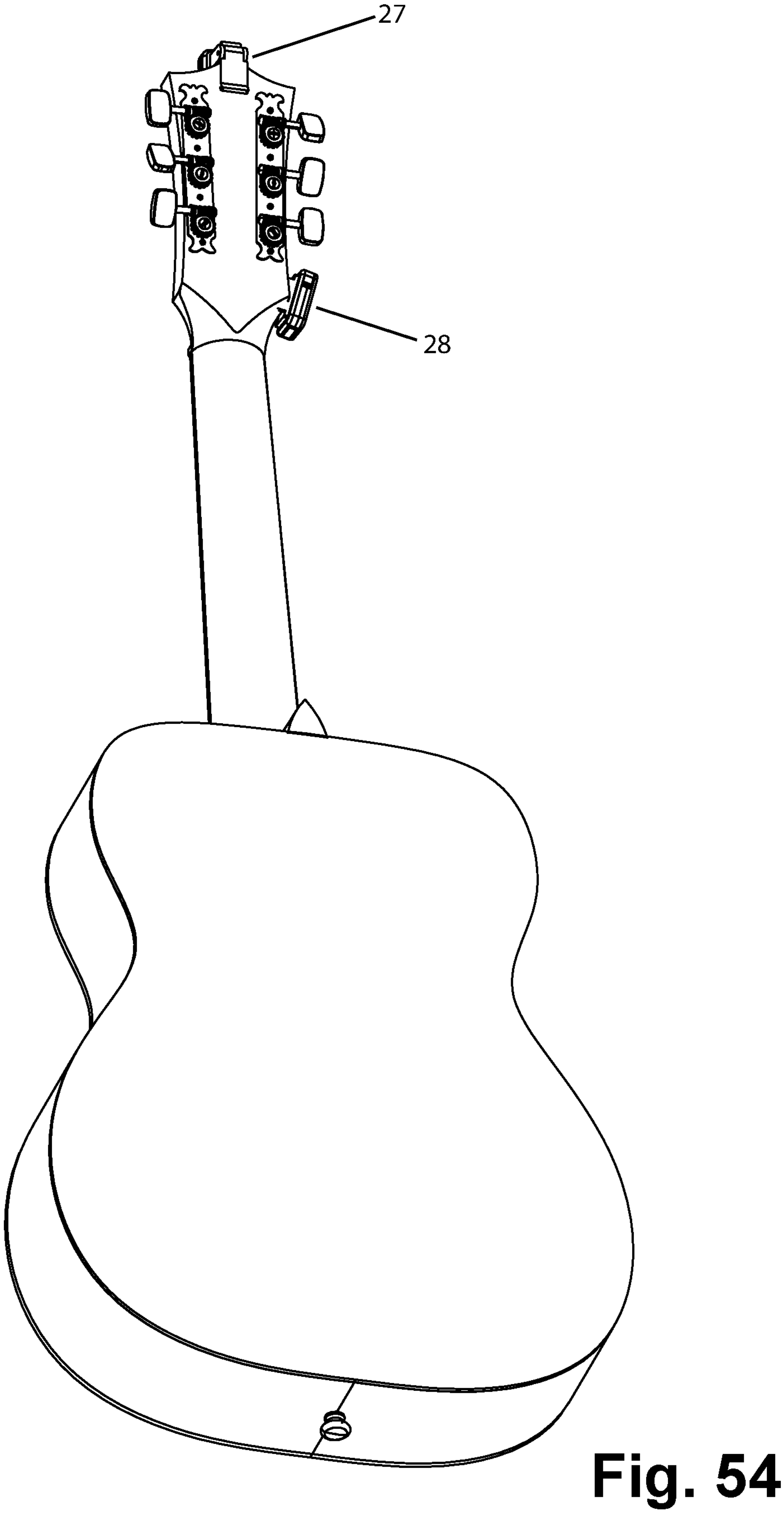
FIG. 54 shows an isometric bottom view of the invention mounted in numerous locations on a guitar.
Figure 55:
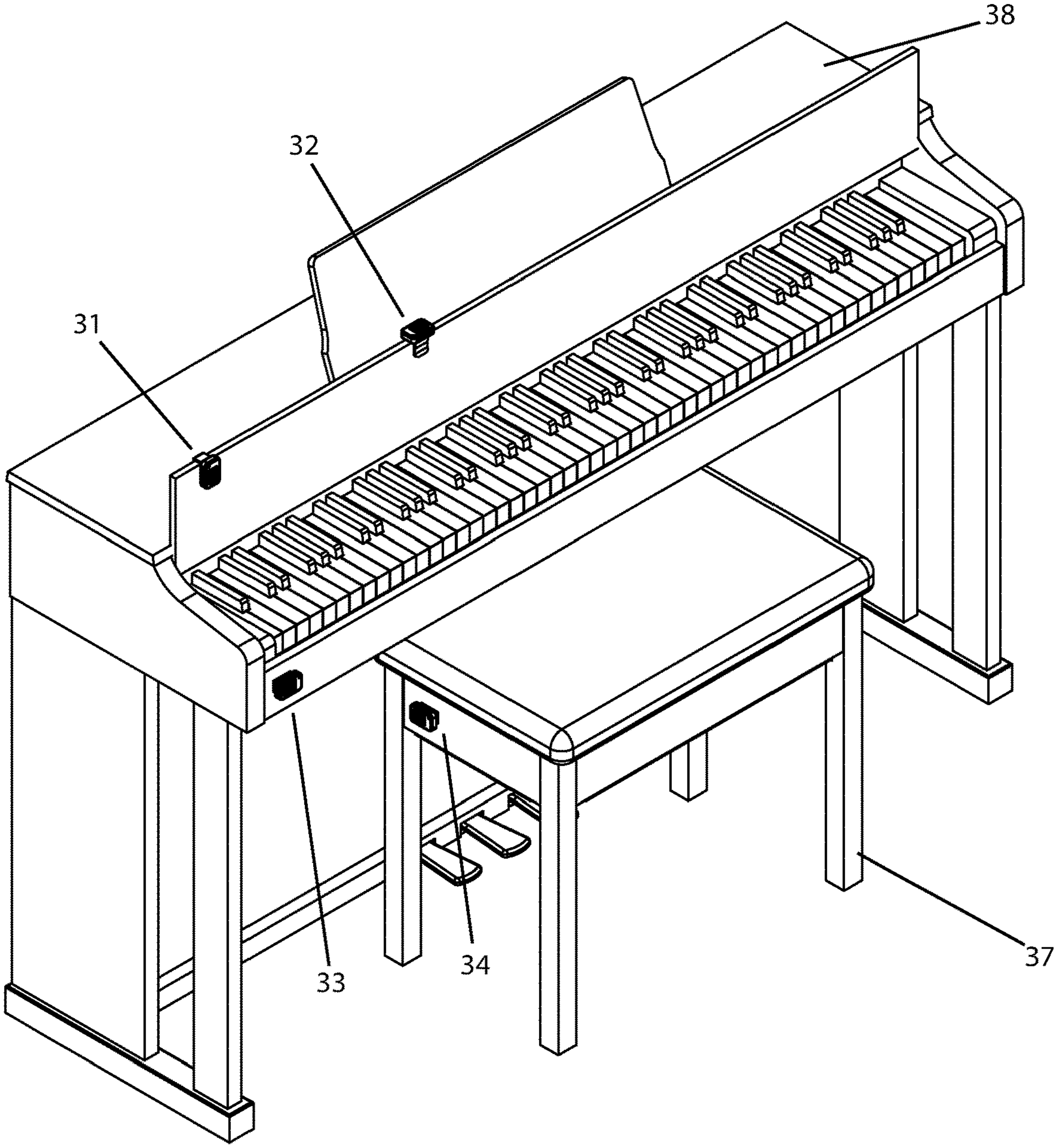
FIG. 55 shows an isometric top view of the invention mounted in numerous locations on a piano and stool, 31, 32, 33, 34.
Figure 56:
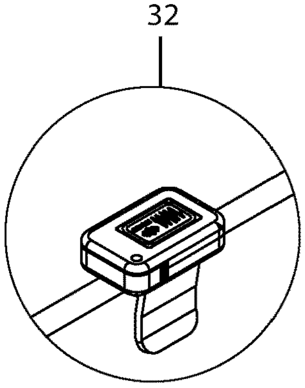
FIG. 56 shows a detailed view of the invention mounted to a piano using mount 19.
Figure 57:
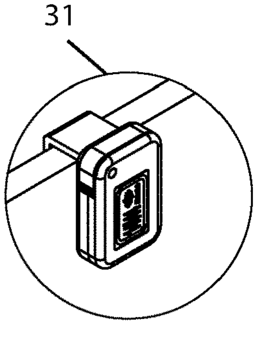
FIG. 57 shows a detailed view of the invention mounted to a piano using mount 20.
Figure 58:
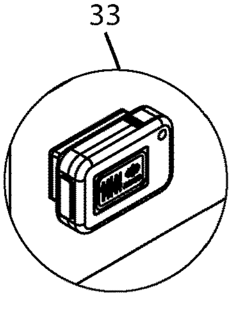
FIG. 58 shows a detailed view of the invention mounted to a piano using mount 21,22.
Figure 59:
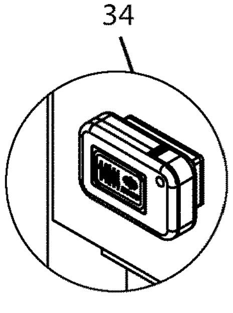
FIG. 59 shows a detailed view of the invention mounted to a piano stool using mount 21,22.
Figure 60:
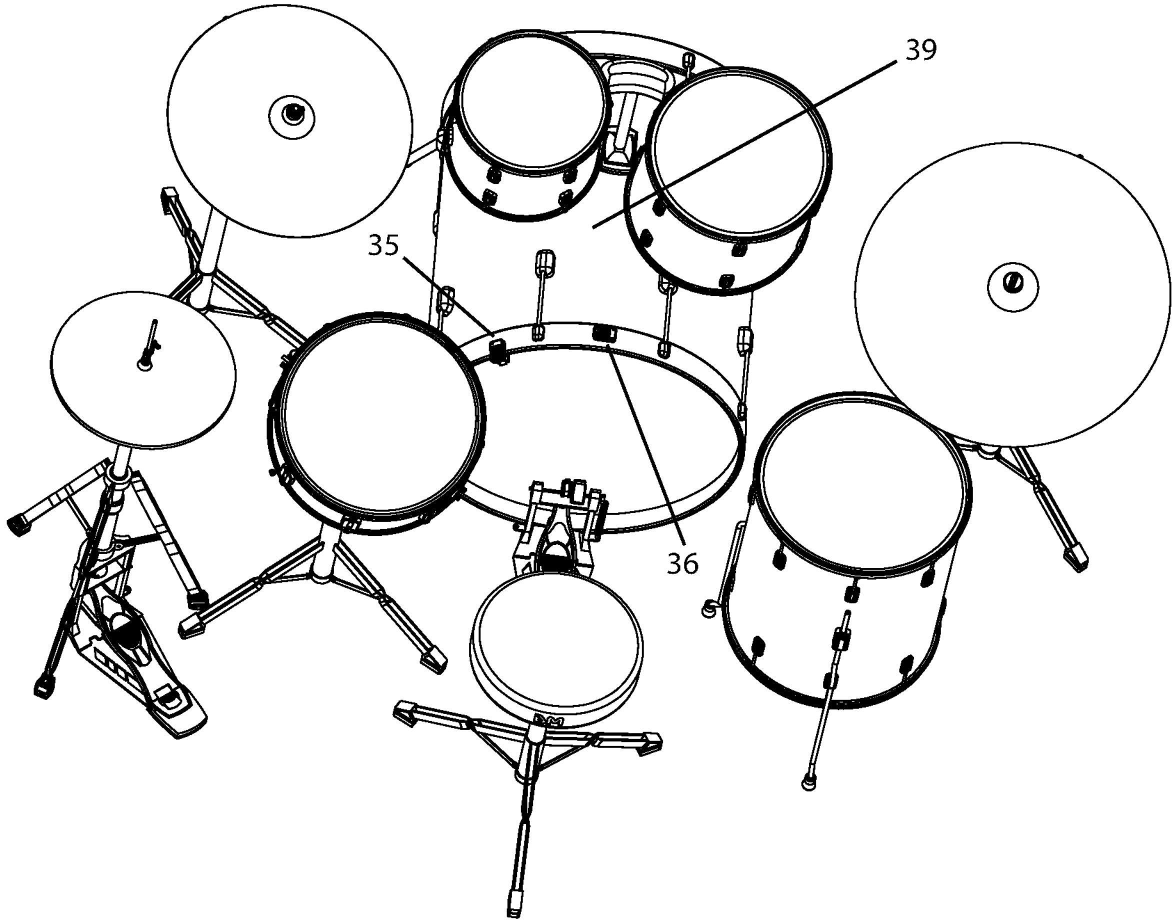
FIG. 60 shows an isometric top view of the invention mounted to a drum set in numerous ways, 36, 35.
Figure 61:
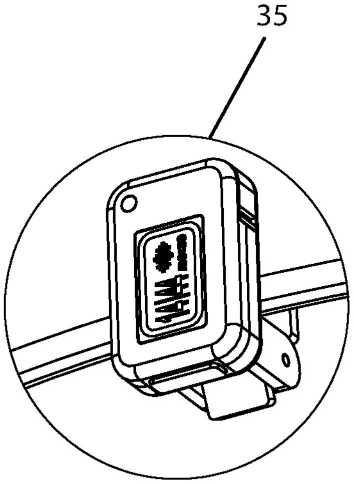
FIG. 61 shows a detailed view of the invention mounted to a drum set via the spring clip. 16,13,15.
Figure 62:
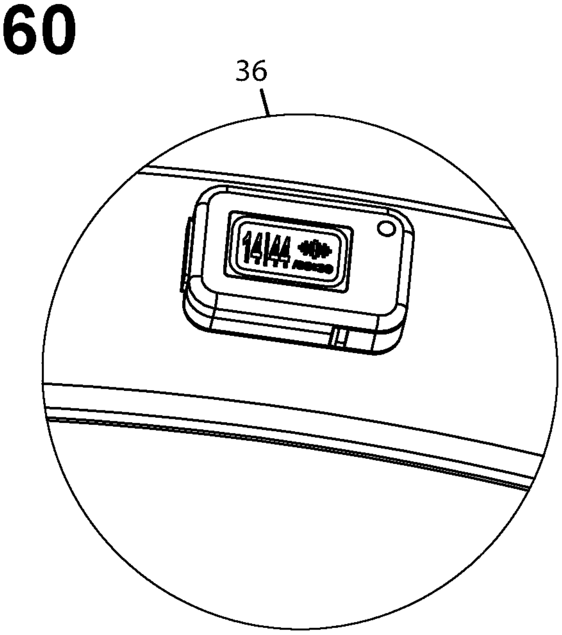
FIG. 62 shows a detailed view of the invention mounted to a drum set via the adhesive mount 21,22.
Figure 63:
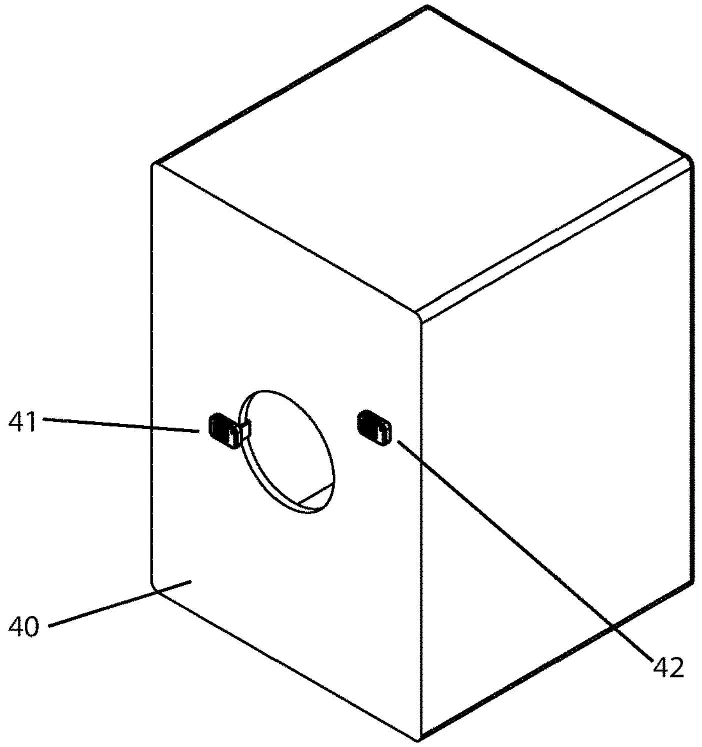
FIG. 63 shows an isometric top view of the invention mounted to a cajon in numerous ways. 42 via an adhesive mount and 41 via a clip mount.
Figure 64:
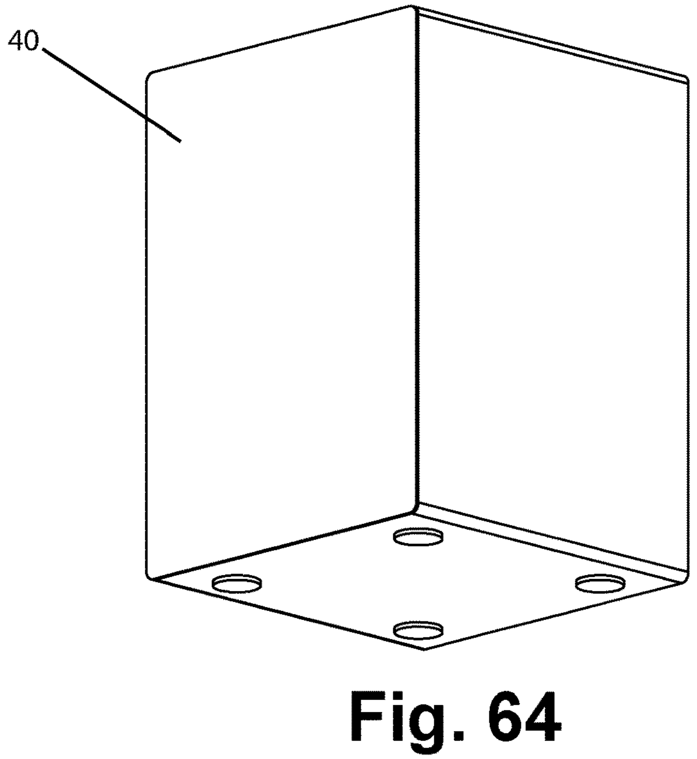
FIG. 64 shows an isometric top view of the invention mounted to a cajon in numerous ways. 42 via an adhesive mount and 41 via a clip mount.
Figure 65:
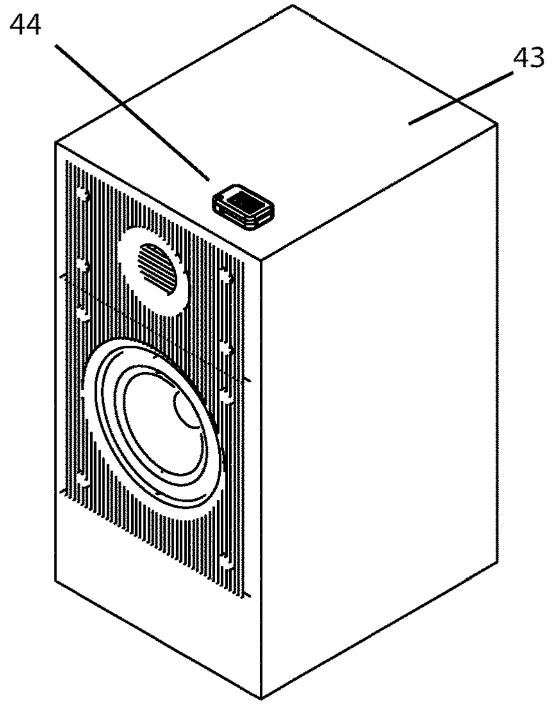
FIG. 65 shows an isometric top view of the invention mounted to a speaker in numerous ways. 42 via an adhesive mount and 41 via a clip mount.
Figure 66:
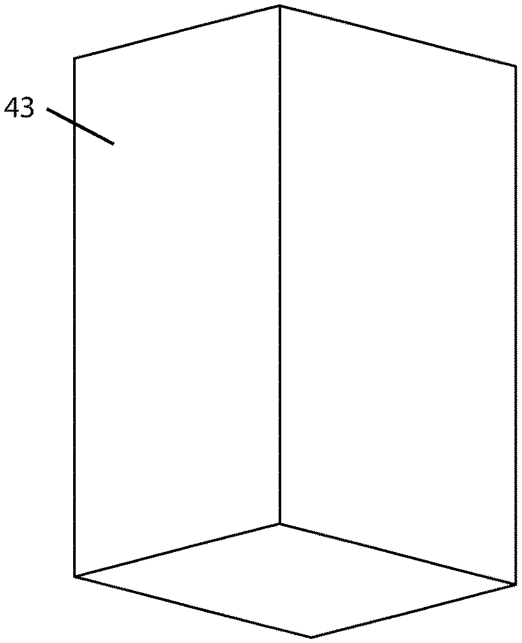
FIG. 66 shows an isometric top view of the invention mounted to a speaker in numerous ways. 42 via an adhesive mount and 41 via a clip mount.
Figure 67:
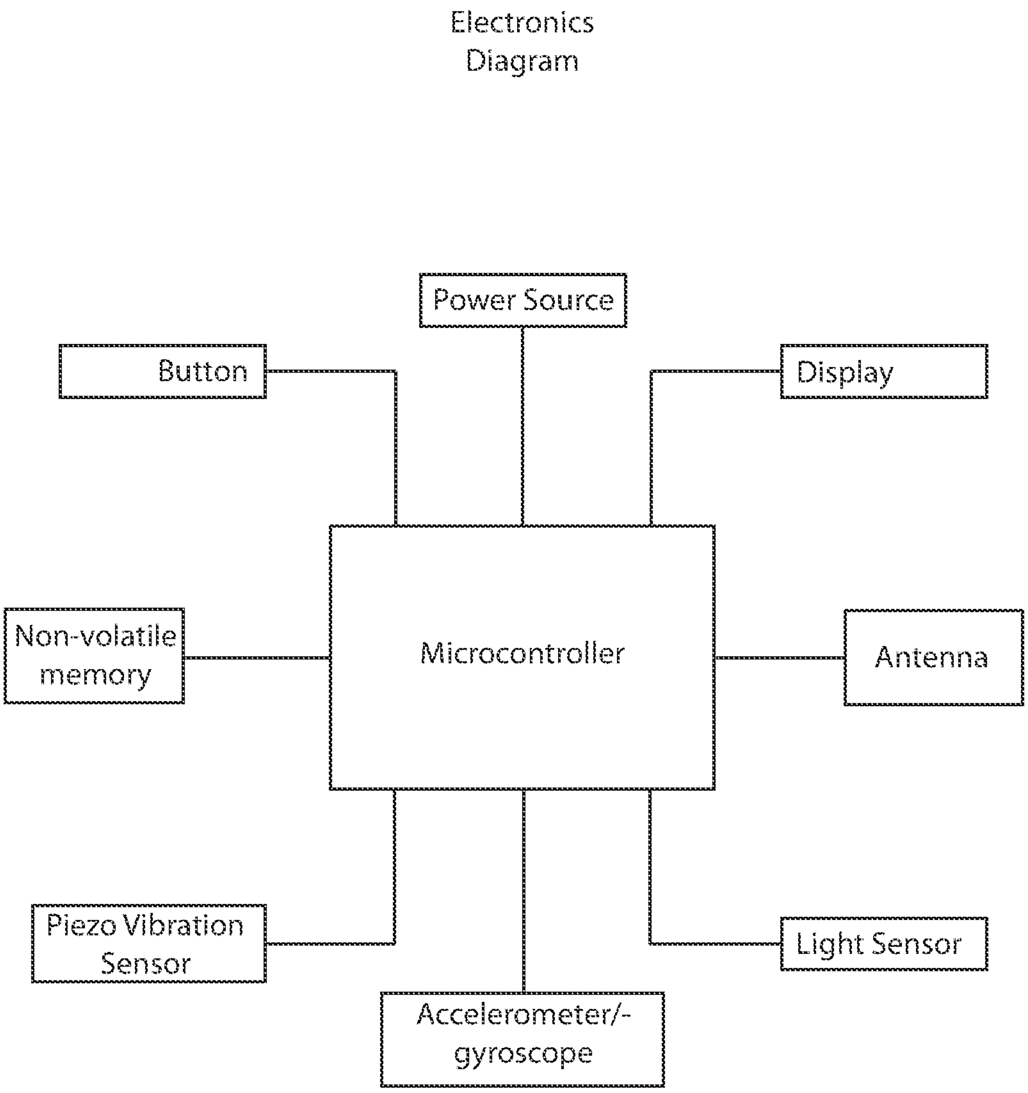
FIG. 67 shows an electronics schematic showing the major components of the invention.

Adhesive mount, demonstrated in numbers 42, 44, 36, 33, 34, 29, 30, 25 and in FIG. 46. Shown in FIG. 39 and FIG. 40, with number 21 showing the mount and number 22 showing the adhesive layer. This clips onto the main assembly via a keyhole slot.

Figure 32:
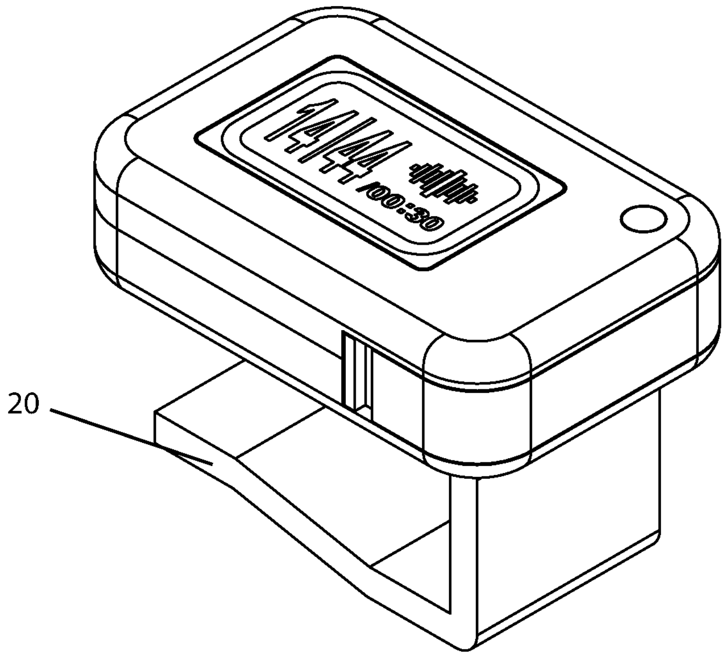
FIG. 32 shows an isometric top view of the invention with an alternative clip design 20 that relies on it elastically deforming to clip onto different pieces of equipment such as the head of a guitar, FIG. 53 27, or piano edge, FIG. 57.
Figure 33:
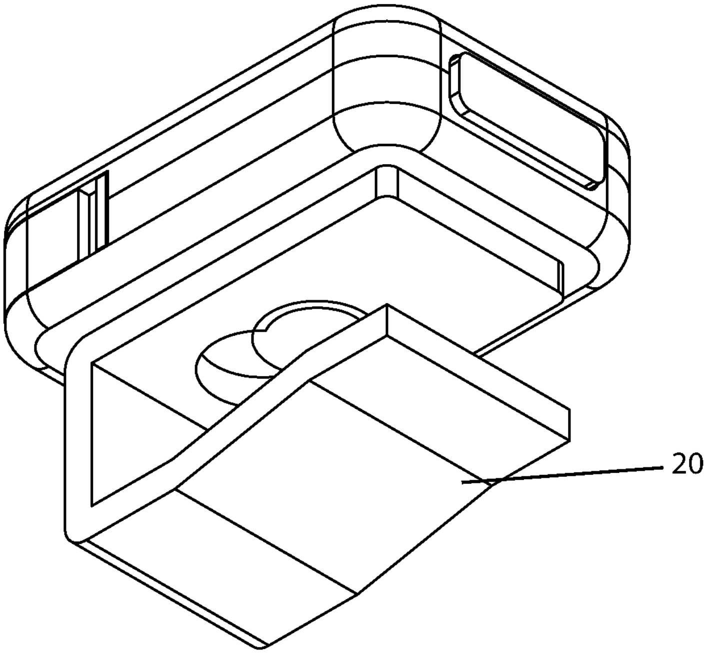
FIG. 33 shows an isometric bottom view of the invention with an alternative clip design 20 that relies on it elastically deforming to clip onto different pieces of equipment such as the head of a guitar, FIG. 53 27, or piano edge, FIG. 57.
Figure 34:
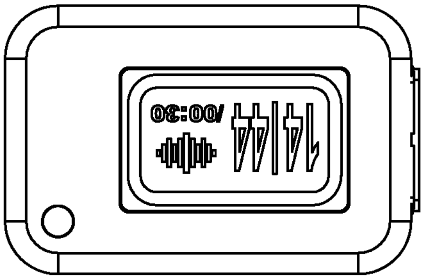
FIG. 34 shows a top view of the invention with alternative clip design 19.
Figure 35:
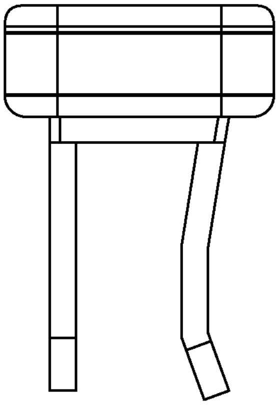
FIG. 35 shows a left side view of the invention with alternative clip design 19.
Figure 36:
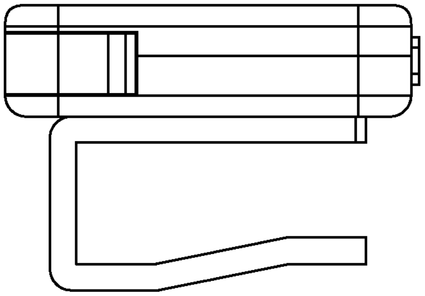
FIG. 36 shows a front view of the invention with alternative clip design 19.
Figure 37:
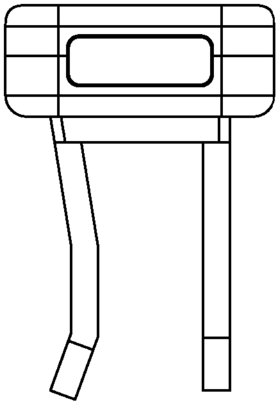
FIG. 37 shows a right side view of the invention with alternative clip design 19.
Figure 38:
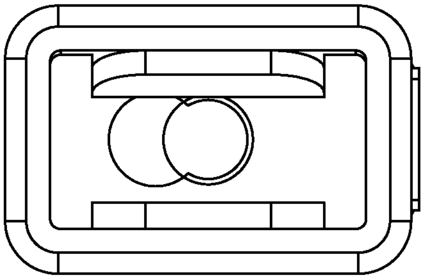
FIG. 38 shows a bottom side view of the invention with alternative clip design 19. Highlighting the keyhole system which attaches the mount 19.

Horizontal clip mount, demonstrated in numbers 28, 32. Shown in FIG. 32 and FIG. 33, with number 19 showing the mount. This clips onto the main assembly via a keyhole slot. The device relies on the plastic clamp elastically deforming to clamp on to an object.

Figure 25:
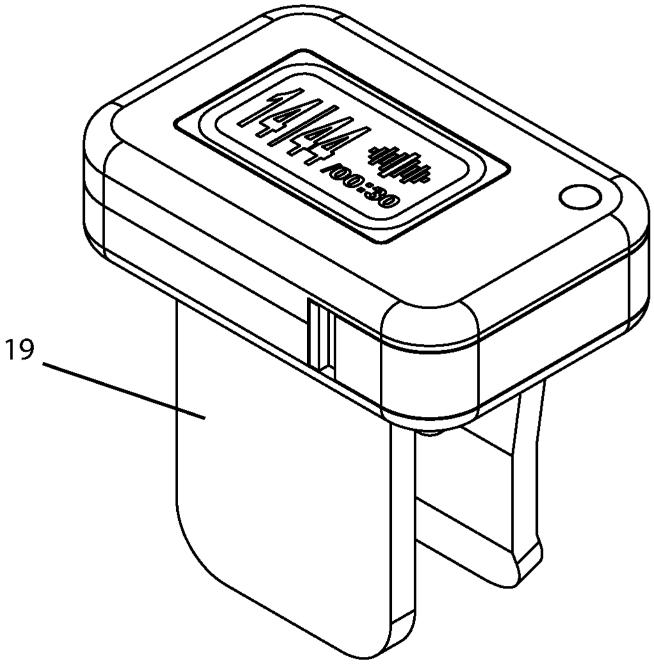
FIG. 25 shows an isometric top view of the invention with an alternative clip design 19 that relies on it elastically deforming to clip onto different pieces of equipment such as the head of a guitar, FIG. 51, or piano edge, FIG. 56.
Figure 26:
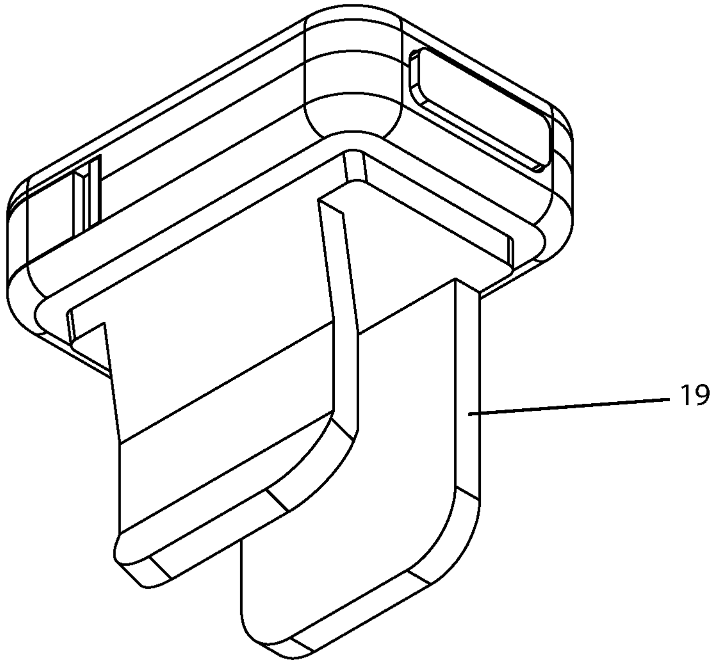
FIG. 26 shows an isometric bottom view of the invention with an alternative clip design 19 that relies on it elastically deforming to clip onto different pieces of equipment such as the head of a guitar, FIG. 51, or piano edge, FIG. 56.
Figure 27:
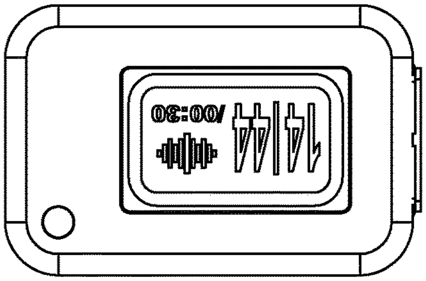
FIG. 27 shows a top view of the invention with alternative clip design 19.
Figure 28:
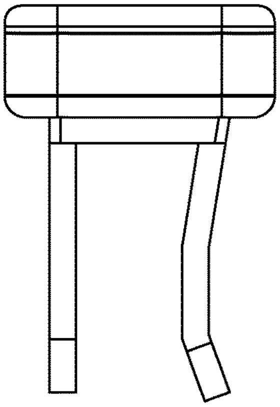
FIG. 28 shows a left side view of the invention with alternative clip design 19.
Figure 29:
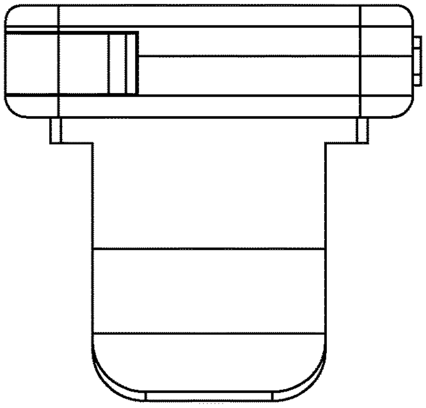
FIG. 29 shows a front view of the invention with alternative clip design 19.
Figure 30:
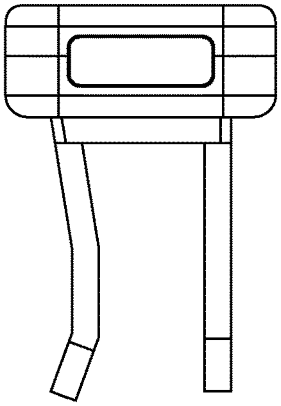
FIG. 30 shows a right side view of the invention with alternative clip design 19.
Figure 31:
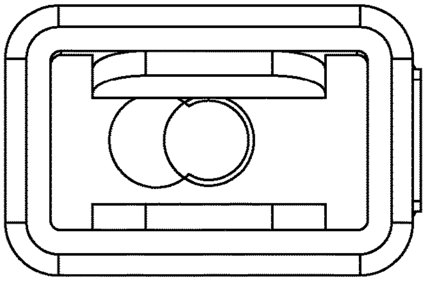
FIG. 31 shows a bottom side view of the invention with alternative clip design 19. Highlighting the keyhole system which attaches the mount 19.

Vertical clip mount, demonstrated in 31. Shown in FIG. 25 and FIG. 26, with number 20 showing the mount. This clips onto the main assembly via a keyhole slot. The device relies on the plastic clamp elastically deforming to clamp on to an object.

Figure 13:
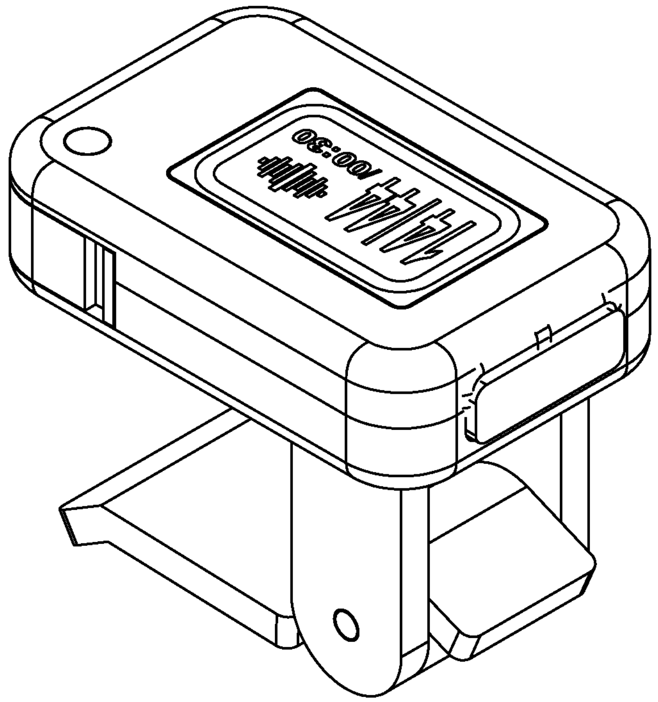
FIG. 13 shows an isometric top view of the invention.
Figure 14:
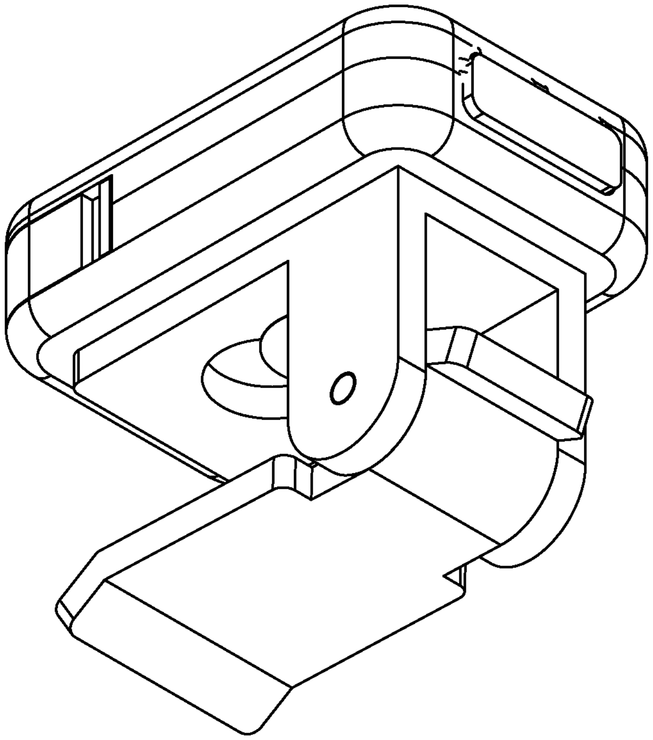
FIG. 14 shows an isometric bottom view of the invention.
Figure 15:
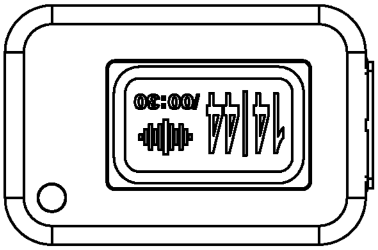
FIG. 15 shows a top view of the invention with the battery sliding housing 3 removed and the coin cell battery 2 removed from the battery sliding housing 3.
Figure 16:
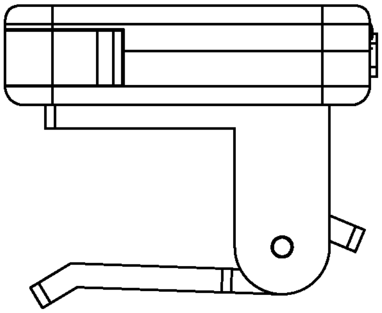
FIG. 16 shows a side view of the invention with the battery sliding housing 3 removed and the coin cell battery 2 removed from the battery sliding housing 3.
Figure 17:
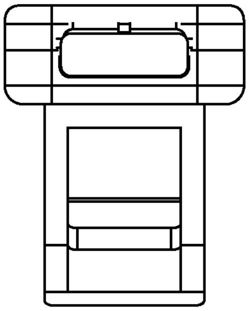
FIG. 17 shows a front view of the invention with the battery sliding housing 3 removed and the coin cell battery 2 removed from the battery sliding housing 3.
Figure 18:
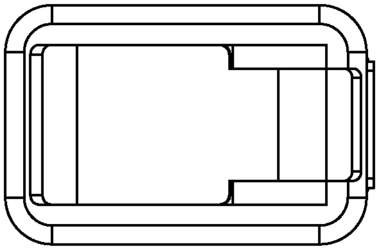
FIG. 18 shows bottom view of the invention with the battery sliding housing 3 removed and the coin cell battery 2 removed from the battery sliding housing 3.
Figure 19:
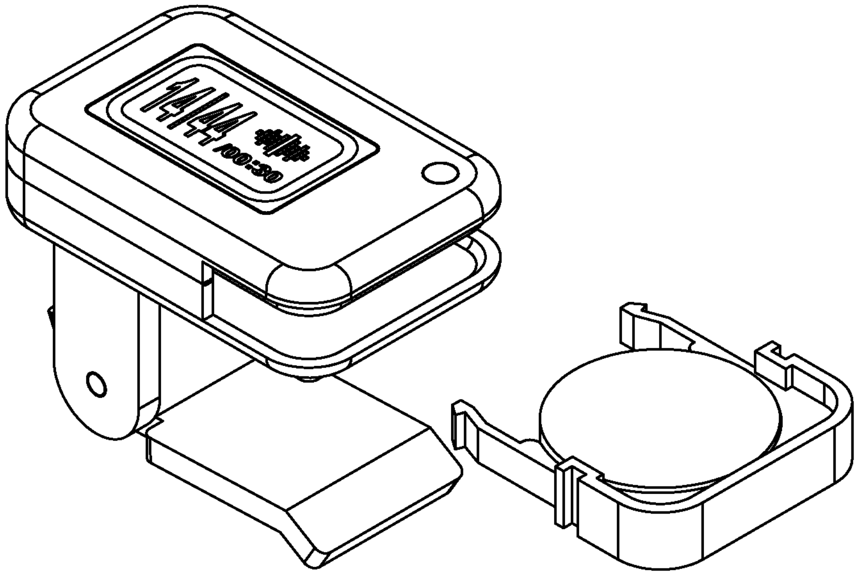
FIG. 19 shows an isometric top view of the invention with the battery sliding housing 3 removed with the coin cell battery 2 in place inside the battery sliding housing 3.
Figure 20:
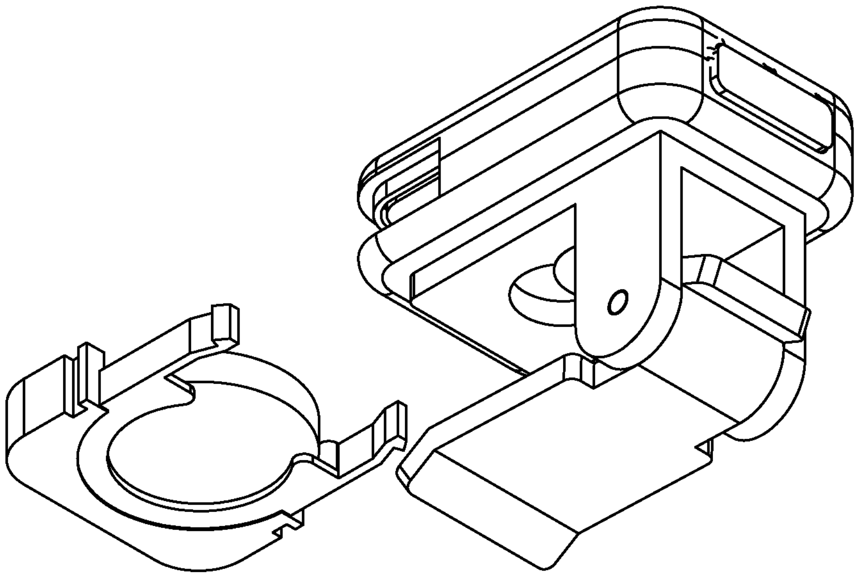
FIG. 20 shows an isometric bottom view of the invention with the battery sliding housing 3 removed with the coin cell battery 2 in place inside the battery sliding housing 3.
Figure 21:
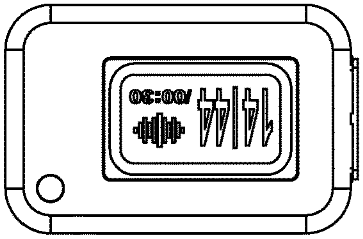
FIG. 21 shows a top view of the invention with the battery sliding housing 3 removed with the coin cell battery 2 in place inside the battery sliding housing 3.
Figure 22:
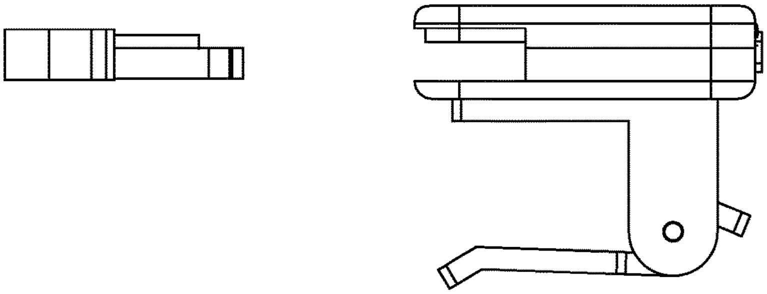
FIG. 22 shows a front view of the invention with the battery sliding housing 3 removed with the coin cell battery 2 in place inside the battery sliding housing 3.
Figure 23:
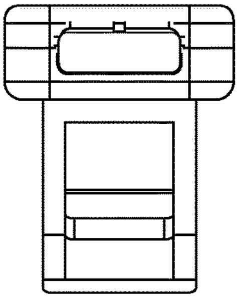
FIG. 23 shows a side view of the invention with the battery sliding housing 3 removed with the coin cell battery 2 in place inside the battery sliding housing 3.
Figure 24:
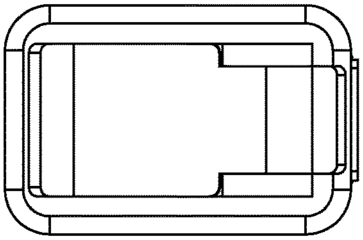
FIG. 24 shows a bottom view of the invention with the battery sliding housing 3 removed with the coin cell battery 2 in place inside the battery sliding housing 3.

Spring clip mount, demonstrated in 27.40,61. Shown in FIG. 13 and FIG. 14, with number 13,15,16 showing the mount. This clips onto the main assembly via a keyhole slot. With the spring arm 16 able to allow the clamp to adapt to a range of sizes.

The Display:

The display is crucial to motivate users to keep practising. This display also needs to be low power and either an e-ink or MIP display based technology or other low power equivalent. This low power aspect of the display is essential as the display needs to be visible at all times, meaning a passing glance can let a user know how much time left to complete their goals. FIGS. 78, 79, 80, 81, 82, 83, 84, 85, 86, 87, 88, 89.

The invention claimed is:

1. A multi-factor verification timing and displaying system for musical or fitness equipment comprising:

a device attached to the equipment arranged to automatically track and display time usage data of the equipment comprising:

a microcontroller with a non-volatile memory;

a display;

at least one button;

a vibration sensor in communication with said microcontroller, wherein the vibration sensor is configured to detect vibrations pertaining to the equipment being in use;

an accelerometer and gyroscope in communication with said microcontroller, wherein the accelerometer and gyroscope are configured to detect motion of the device;

a light sensor configured to sense visible and non-visible spectrum light in communication with said microcontroller, wherein the light sensor is configured to detect if the equipment is being stored and to detect if the device is in proximity of a warm body;

an antenna in communication with said microcontroller, wherein the antenna is configured to communicate usage time data to a remote device;

a power source; and an adjustable mount, wherein the adjustable mount detachably couples the device to the equipment;

wherein the microcontroller is configured to detect the usage time data of the equipment that the device is attached to, store said usage time data to said non-volatile memory, and display said usage time data on the display;

wherein said display visually communicates said usage time data;

wherein the at least one button and the microcontroller are configured to allow the user to selectively choose a time period in which to view the usage time data;

wherein the microcontroller is configured to activate a timer to time usage of the equipment based on the whether all of the following usage factors have been met in the listed order:

(a) the vibration sensor detects a sound, thereby activating the device from low power sleep mode;

(b) the microcontroller compares the detected sound data to a first database of reference sound data values and determines that the sound is indicative of the equipment being used;

(c) the microcontroller compares the detected motion data to a second database of reference motion data values and determines that the motion is indicative of the equipment being used;

(d) the microcontroller compares the detected motion data to said detected sound data and determines that a predetermined correlation exists between the detected motion data and the detected sound data; and (e) the microcontroller determines if the light sensor data includes both visible light and infrared light;

wherein the microcontroller is further configured to periodically reevaluate the usage factors to determine if the device remains in use, wherein the microcontroller is configured to stop the timer once any data of the usage factors is no longer met, wherein said microcontroller includes selectively adjustable settings that allow a user to configure different data settings for any of the vibration sensor, accelerometer, gyroscope, and light sensor according to the type of equipment that the device is attached to.

2. The multi-factor verification timing and displaying system according to claim 1, wherein the microcontroller and the at least one button are configured to selectively allow the device to enter different modes that respectively correspond to different equipment that may be attached to the device, said different modes comprising different sensitivities of one or more of the vibration sensor, the light sensor, the accelerometer, and the gyroscope.

3. The multi-factor verification timing and displaying system according to claim 1, wherein the device is configured to receive wireless input to enter different modes that, respectively correspond to different equipment that may be attached to the device, said different modes comprising different sensitivities of one or more of the vibration sensor, the light sensor, the accelerometer, and the gyroscope.

4. The multi-factor verification timing and displaying system according to claim 1, wherein the microcontroller is configured to enter different modes of the device, said different modes respectively corresponding to different types of equipment that may be attached to the device, said different modes comprising different sensitivities of one or more of the vibration sensor, the light sensor, the accelerometer, and the gyroscope.

5. The multi-factor verification timing and displaying system according to claim 1, wherein the adjustable mount includes adhesive.

6. The multi-factor verification timing and displaying system according to claim 1, wherein the adjustable mount includes magnets.

7. The multi-factor verification timing and displaying system according to claim 1, wherein the microcontroller is configured to receive an input from the equipment attached to the device and said microcontroller sets a mode of the device based on the received input.

8. The multi-factor verification timing and displaying system according to claim 1, wherein the vibration sensor, the light senor, the accelerometer, and the gyroscope are configured to tune an instrument connected to the device.

9. The multi-factor verification timing and displaying system according to claim 1, wherein the device is attached to at least one stringed instrument.

10. The multi-factor verification timing and displaying system according to claim 1, wherein the device is attached to at least one woodwind instrument.

11. The multi-factor verification timing and displaying system according to claim 1, wherein the device is attached to at least one percussive instrument.

12. The multi-factor verification timing and displaying system according claim 1, wherein the device is attached to at least one brass instrument.

13. The multi-factor verification timing and displaying system according to claim 1, wherein the device is attached to at least one keyboard instrument.

14. The multi-factor verification timing and displaying system according to claim 1, wherein the device is attached to at least one guitar instrument.

15. A multi-factor verification timing and displaying system for musical or fitness equipment comprising:

a device attached to the equipment arranged to automatically track and display time usage data of the equipment comprising:

a microcontroller with a non-volatile memory;

a display;

at least one button;

a vibration sensor in communication with said microcontroller, wherein the vibration sensor is configured to detect vibrations pertaining to the equipment being in use;

an accelerometer and gyroscope in communication with said microcontroller, wherein the accelerometer and gyroscope are configured to detect motion of the device;

a light sensor configured to sense visible and non-visible spectrum light in communication with said microcontroller, wherein the light sensor is configured to detect if the equipment is being stored and to detect if the device is in proximity of a warm body;

an antenna in communication with said microcontroller, wherein the antenna is configured to communicate usage time data to a remote device;

a power source; and an adjustable mount, wherein the adjustable mount detachably couples the device to the equipment;

wherein the microcontroller is configured to detect the usage time data of the equipment that the device is attached to, store said usage time data to said non-volatile memory, and display said usage time data on the display;

wherein said display visually communicates said usage time data;

wherein the at least one button and the microcontroller are configured to allow the user to selectively choose a time period in which to view the usage time data;

wherein the microcontroller is configured to activate a timer to time usage of the equipment based on the whether all of the following usage factors have been met in the listed order:

a) the accelerometer and gyroscope detect movement, thereby activating the device from low power sleep mode;

b) the microcontroller compares the detected accelerometer and gyroscope movement data with a first database of reference movement values and determines that the movement is indicative of the equipment being used;

c) the microcontroller compares detected vibration sensor data with a second database of reference sound values and determines that the vibration sensor data is indicative of the equipment being used;

d) the microcontroller compares the detected movement data to said detected vibration sensor data and determines that a predetermined correlation exists between the detected movement data and the detected vibration sensor data; and e) the microcontroller determines if the light sensor data includes both visible light and infrared light;

wherein the microcontroller is configured to periodically reevaluate the usage factors to determine if the device is still in use, and wherein the microcontroller is configured to stop the timer once any data of the usage factors is no longer met.

* * * * *